(12) United States Patent
Kaneko

(10) Patent No.: US 8,610,918 B2
(45) Date of Patent: Dec. 17, 2013

(54) MANAGEMENT APPARATUS AND IMAGE FORMING APPARATUS FOR PART REPLACEMENT BASED ON OPERATION MODE

(75) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1079 days.

(21) Appl. No.: 12/249,517

(22) Filed: Oct. 10, 2008

(65) Prior Publication Data

US 2009/0097061 A1    Apr. 16, 2009

(30) Foreign Application Priority Data

Oct. 12, 2007    (JP) .................... 2007-266740

(51) Int. Cl.
*G06F 3/12*    (2006.01)

(52) U.S. Cl.
USPC ............. 358/1.15; 358/1.14; 399/24; 399/27; 399/81

(58) Field of Classification Search
USPC ................. 358/1.14, 1.15; 399/24, 27, 81
See application file for complete search history.

(56) References Cited

U.S. PATENT DOCUMENTS

| | | | | |
|---|---|---|---|---|
| 2002/0118383 A1* | 8/2002 | Kamiya | ................... | 358/1.13 |
| 2004/0170460 A1* | 9/2004 | Mokuya et al. | ................. | 400/76 |
| 2006/0173557 A1* | 8/2006 | Kisanuki | .................. | 700/12 |
| 2007/0053701 A1* | 3/2007 | Nagata et al. | ................... | 399/24 |
| 2007/0237537 A1* | 10/2007 | Hasegawa et al. | .............. | 399/81 |

FOREIGN PATENT DOCUMENTS

JP    2002-149507 A    5/2002

* cited by examiner

*Primary Examiner* — Jacky X Zheng
(74) *Attorney, Agent, or Firm* — Canon USA Inc. IP Division

(57) ABSTRACT

A management server receives a notification from an image forming apparatus as to an operation mode of the image forming apparatus in response to an operation performed by a service person. The management server detects a status change in the image forming apparatus from the received notification. The management server then produces a replacement part list in accordance with management information stored in the management server and in accordance with the notified operation mode of the image forming apparatus and the detected status change. The management server transmits the produced replacement part list to the image forming apparatus.

20 Claims, 16 Drawing Sheets

FIG. 5

| S/N OF IMAGE FORMING APPARATUS | DATE/TIME | STATUS CHANGE | STATUS CODE |
|---|---|---|---|
| | 501 | 502 | 503 | 504 |
| DEV000000001 | 08/25/2006 14:10 | SWITCHED INTO OPERATOR MAINTENANCE MODE | 02010001 |
| | 08/25/2006 14:13 | MAIN FRONT DOOR OPENED | 03030001B |
| | 08/25/2006 14:23 | SWITCHED INTO NORMAL MODE | 02010000 |
| | 12/15/2006 13:20 | SWITCHED INTO OPERATOR MAINTENANCE MODE | 02010001 |
| | 12/15/2006 13:27 | RIGHT DOOR OPENED | 03030004 |
| | 12/15/2006 13:42 | LOWER LEFT DOOR OPENED | 03030005 |
| | 12/15/2006 13:50 | UPPER RIGHT DOOR OPENED | 03030003 |

| STATUS CHANGE 601 | STATUS CODE 602 | REPLACEMENT PART NAME 603 | REPLACEABLE IN OPERATOR MAINTENANCE MODE 604 | REPLACEABLE IN SERVICE MODE 605 | REPLACEABLE IN NORMAL MODE 606 |
|---|---|---|---|---|---|
| MAIN FRONT DOOR OPENED | 03030001 | FIXING UNIT | ○ | ○ | × |
| | | INTERMEDIATE TRANSFER UNIT | ○ | ○ | × |
| | | ITB DRIVE ROLLER CLEANING SCRAPER | × | ○ | × |
| | | DRUM (Y) | ○ | ○ | × |
| | | DRUM (M) | ○ | ○ | × |
| | | DRUM (C) | ○ | ○ | × |
| | | DRUM (K) | ○ | ○ | × |
| | | TONER CARTRIDGE | × | × | ○ |
| UPPER RIGHT DOOR OPENED | 03030003 | SECOND TRANSFER CLEANER KIT | ○ | × | ○ |
| LEFT DOOR OPENED | 03030007 | FIXING BELT PRESSURE PAD COVER | × | ○ | × |
| | | FIXING BELT PRESSURE PAD | × | ○ | × |
| RIGHT DOOR OPENED | 03030004 | SUB STATION REAR-LEFT OZONE FILTER | ○ | ○ | × |
| | | SUB STATION REAR-UPPER OZONE FILTER | ○ | ○ | × |
| UPPER LEFT DOOR OPENED | 03030005 | FIRST FIXING REFRESH ROLLER | ○ | × | × |
| | | SECOND FIXING REFRESH ROLLER | ○ | × | × |
| FINISHER COVER OPENED | 03030010 | STAPLE | × | × | ○ |
| ⋯ | ⋯ | ⋯ | | | |

600

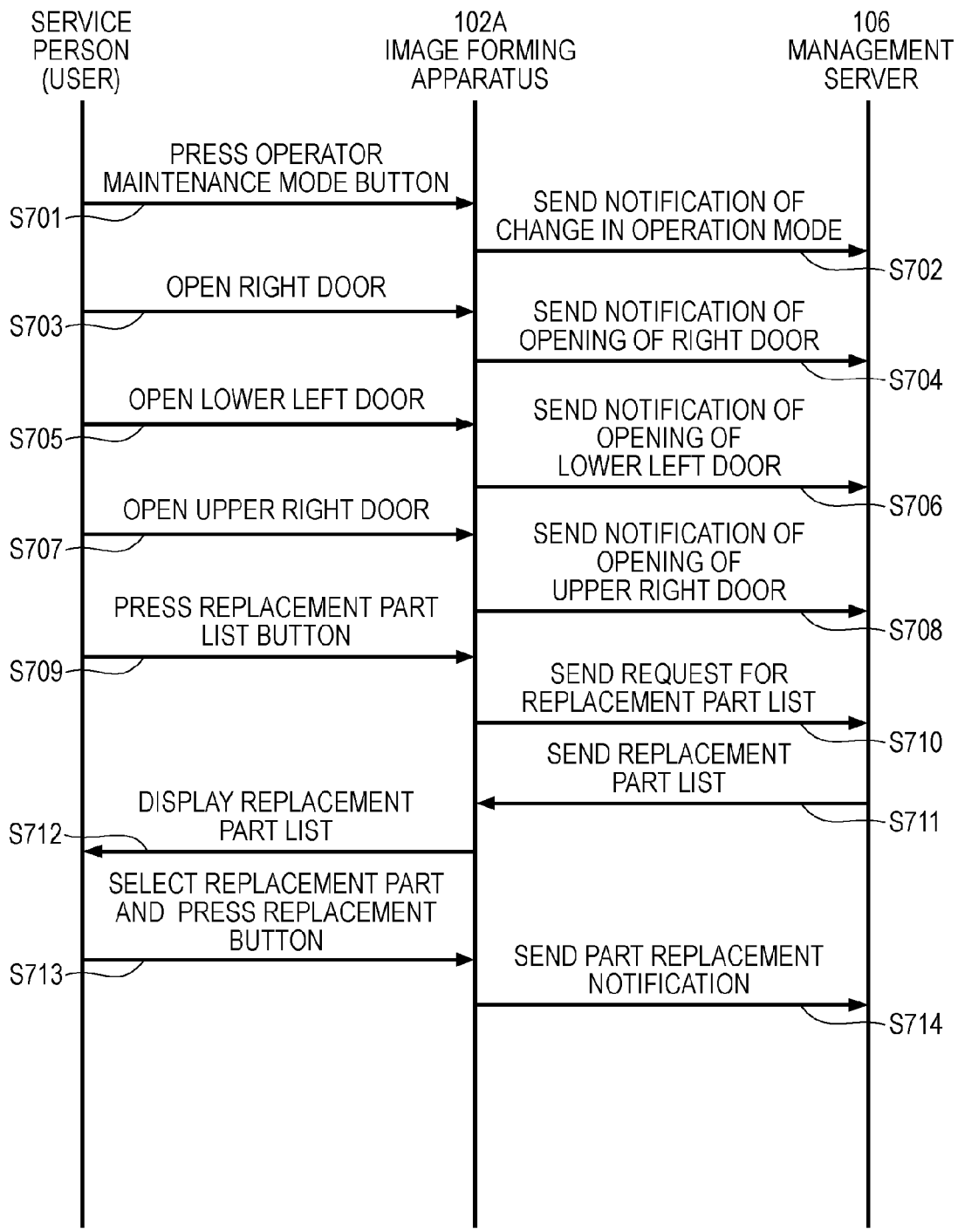

FIG. 15

STORAGE MEDIUM SUCH AS FD/CD-ROM

| DIRECTORY INFORMATION |
|---|
| FIRST PROCESSING PROGRAM SET OF PROGRAM CODES CORRESPONDING TO RESPECTIVE STEPS IN FLOW CHART SHOWN IN FIG. 8 |
| SECOND PROCESSING PROGRAM SET OF PROGRAM CODES CORRESPONDING TO RESPECTIVE STEPS IN FLOW CHART SHOWN IN FIG. 13 |

FIG. 16

STORAGE MEDIUM SUCH AS FD/CD-ROM

| DIRECTORY INFORMATION |
|---|
| FIRST PROCESSING PROGRAM<br>SET OF PROGRAM CODES CORRESPONDING TO RESPECTIVE STEPS IN FLOW CHART SHOWN IN FIG. 9 |
| SECOND PROCESSING PROGRAM<br>SET OF PROGRAM CODES CORRESPONDING TO RESPECTIVE STEPS IN FLOW CHART SHOWN IN FIG. 14 |

MANAGEMENT APPARATUS AND IMAGE FORMING APPARATUS FOR PART REPLACEMENT BASED ON OPERATION MODE

BACKGROUND OF THE INVENTION

1. Field of the Invention

The present invention relates to a process of displaying replacement parts for an image forming apparatus according to replacement part information managed by a management apparatus.

2. Description of the Related Art

In a conventional system of managing an image forming apparatus, an operation of replacing a part of the image forming apparatus is performed as follows. First, a service person operates an operation panel of the image forming apparatus to change the operation mode into a desired mode, and then the service person replaces the part. After the part replacement, the service person selects the replaced part in a list of parts displayed on a screen of the operation panel thereby managing stocks of parts (see, for example, Japanese Patent Laid-Open No. 2002-149507).

However, the list displayed on the screen of the operation panel of the image forming apparatus includes all replaceable parts, and thus there is a possibility that the service person selects a wrong part different from an actually replaced part. This can cause a problem in the management of stocks of parts.

SUMMARY OF THE INVENTION

An embodiment of the present invention provides a technique to display a replacement part list based on a status change in an image forming apparatus whose status changes in accordance with an operation performed by a user (a service person).

More specifically, an embodiment of the present invention provides a management apparatus including a storage unit configured to store management information indicating a correspondence among an operation mode of an image forming apparatus, a status change in the operation mode, and replacement part information, a receiving unit configured to receive a notification of the operation mode of the image forming apparatus, an acquisition unit configured to acquire the status change in the image forming apparatus, a generation unit configured to refer to the management information stored in the storage unit and generate a replacement part list according to the operation mode of the image forming apparatus received via the receiving unit and the status change acquired via the acquisition unit, and a transmitting unit configured to transmit the replacement part list generated by the generation unit to the image forming apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates an example of a status change log table stored in a management server.

FIG. 6 illustrates an example of a status change-replacement part correspondence table stored in a management server.

FIG. 7 illustrates an example of a communication sequence performed in a management system when a part is replaced.

FIG. 15 is a diagram illustrating a memory map of a storage medium that stores various data processing programs readable by a management apparatus according to an exemplary embodiment of the present invention.

FIG. 16 is a diagram illustrating a memory map of a storage medium that stores various data processing programs readable by an image forming apparatus according to an exemplary embodiment of the present invention.

DESCRIPTION OF THE EMBODIMENTS

The present invention is described in further detail below with reference to exemplary embodiments in conjunction with the accompanying drawings.

System Configuration

First Exemplary Embodiment

Figure 1:
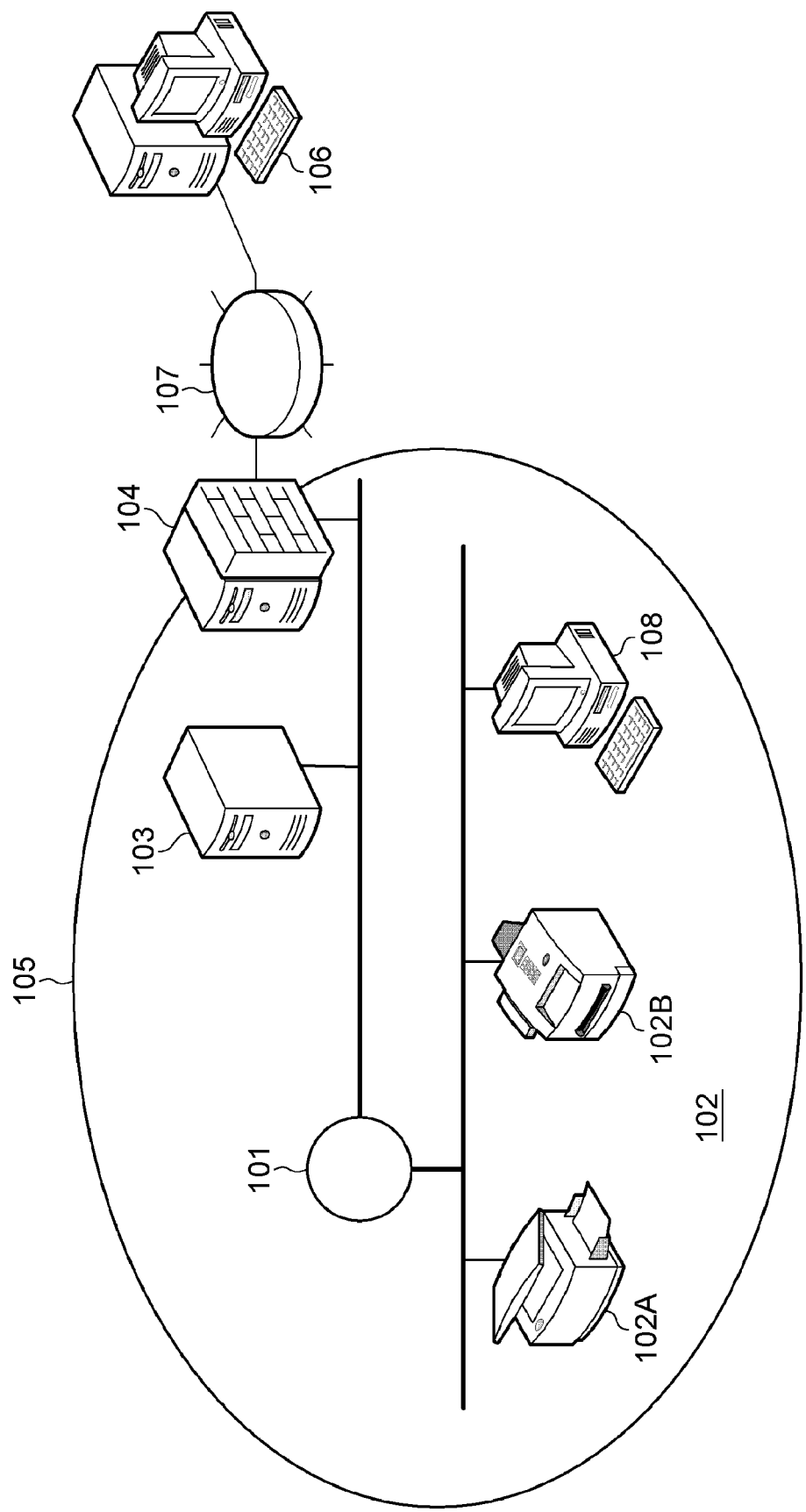
FIG. 1 is a diagram illustrating a management system for image forming apparatuses according to an exemplary embodiment of the present invention.

FIG. 1 illustrates a management system for an image forming apparatus, according to a first exemplary embodiment of the present invention. In this example of the management system, the image forming apparatus is connected to a management server via the Internet such that they can communicate with each other via the Internet. In the present embodiment, the image forming apparatus may be an image forming apparatus having multi functions or a printer having a printing capability.

The image forming apparatus includes a plurality of opening-and-closing parts and a plurality of attachable-and-detachable parts. Some or all of opening-and-closing part may be configured to be openable only in a state in which one or more other opening-and-closing parts are opened. Examples of attachable-and-detachable parts include a toner cartridge, a photosensitive drum, a charger, a fixing unit, and a roller. Opening-and-closing parts are parts configured to cover a part of the image forming apparatus. Examples of opening-and-closing parts are an outer cover and an inner cover. The number of inner covers may vary depending on the specific image forming apparatus. Instead of configuring the inner covers in an openable-and-closable form, some or all of the inner cover may be configured to be attachable and detachable using screws or the like.

Furthermore, some or all of opening-and-closing parts may be configured to be openable only in a state in which one or more attachable-and-detachable parts are removed.

For example, to replace a toner hopper, it is necessary to first open an outer cover and then open an inner cover. In the present embodiment, a list of replacement parts displayed on the operation unit is changed depending on whether the image forming apparatus is in a state in which both the outer cover and the inner cover are opened or in a state in which only the outer cover is opened thereby to prevent an operator from selecting a wrong part or performing a wrong operation.

The state or manner in which an attachable-and-detachable part and an opening-and-closing part are engaged with each other varies depending on the specific configuration of the image forming apparatus. Thus, for example, to open the inner cover after the outer cover is opened, it is necessary to remove an attachable-and-detachable part, depending on the configuration.

In FIG. 1, reference numeral 102 generically denotes image forming apparatuses, which will be described in further detail below with reference to FIGS. 2A and 2B. Note that a plurality of image forming apparatuses, such as image forming apparatuses 102A and 102B in FIG. 1, may be connected to a network (LAN) 101. The plurality of image forming apparatuses such as image forming apparatuses 102A and 102B may or may not be similar in functions or specifications to each other. The image forming apparatus such as the image forming apparatus 102A or 102B has sensors adapted to detect the opened/closed state or the attached/detached state of each opening-and-closing part or attachable-and-detachable part, and the detected state is notified as a status change to the management server 106 as will be described below. In the following explanation, when it is not necessary to distinct the image forming apparatuses 102A and 102B from each other, an expression "image forming apparatus 102" will be used to generically denote the image forming apparatuses 102A and 102B.

Reference numeral 108 denotes a personal computer (PC) used by a general user in his/her job. In the PC 108, an operating system installed in an external storage unit is loaded into a RAM, and a CPU performs various kinds of data processing by executing various applications.

Reference numeral 103 denotes a proxy server that allows a plurality of users to connect to the Internet from an intranet using a protocol such as HTTP or HTTPS. Reference numeral 104 denotes a firewall used to achieve high security of the intranet. As shown in FIG. 1, the devices described above are connected to each other via the LAN 101.

Reference numeral 106 denotes a management server that manages, in a centralized manner, operation statuses of the image forming apparatuses 102A and 102B connected to the LAN 101. The management server 106 includes a controller including a CPU, a RAM, and a ROM. The management server 106 further includes a network controller, an input/output device, and an external storage unit. In the management server 106, an operating system stored in the external storage unit is loaded into the RAM, and the CPU performs a management process in the system by executing a management program.

Reference numeral 105 denotes an intranet environment in which image forming apparatuses such as the image forming apparatuses 102A and 102B are connected to the proxy server 103 and the firewall 104 via the LAN 101 so as to form a total management system.

In practice, a plurality of intranet environments 105 may be connected to the management server 106 via the Internet 107 such that apparatuses can communicate with each other.

The image forming apparatuses 102A and 102B perform communication via the LAN 101 according to their own communication schedule. More specifically, according to the communication schedule, the image forming apparatuses 102A and 102B produces communication data indicating the operation mode, the count value, operation information such as an operation log, failure information such as hardware failure information, error information such as jam information, etc. The resultant communication data is transmitted using a predetermined protocol to the management server 106 from the image forming apparatuses 102A and 102B via the Internet 107.

The management server 106 sends a command, such as a setting information update command, a reboot command, etc., to the image forming apparatus 102A or 102B via the Internet 107 using a predetermined communication protocol.

The communication described above may be performed, for example, using MIB (Management Information Base) via SNMP (Simple Network Management Protocol).

In the present embodiment, it is assumed that HTTP or HTTPS is used as the communication protocol, although the communication protocol is not limited to HTTP or HTTPS.

In the example shown in FIG. 1, HTTPS is used in transmission of data from the image forming apparatuses 102A and 102B to the management server 106 via the proxy server 103 and the firewall 104.

The management server 106 controls the image forming apparatuses 102A and 102B by issuing a command to the image forming apparatuses 102A and 102B. At regular intervals or upon occurrence of an event, the image forming apparatuses 102A and 102B access the management server 106 to acquire commands. Thus, the commands issued by the management server 106 are stored in the management server 106 until they are acquired by the image forming apparatus 102A or 102B. Hereinafter, the process performed by image forming apparatus 102A or 102B to access the management server 106 and acquire a command from the management server 106 will be referred to as a command requesting process.

The command acquisition is performed, for example, via https communication with the management server 106 using an SSL certificate stored in the image forming apparatus 102A or 102B.

Note that the communication is started using a specific SSL certificate so that the management server 106 can recognize that the apparatus that started the communication is one of apparatuses that are under the management of the management server 106.

After the https communication is established, the image forming apparatus sends an ID assigned thereto to uniquely identify it to the management server 106 using the SOAP protocol or the like. This allows the management server 106 to know which image forming apparatus initiated the communication. By returning a response with a command, the management server 106 can control the specific image forming apparatus such as the image forming apparatus 102A or 102B via the Internet 107.

Figure 2A:
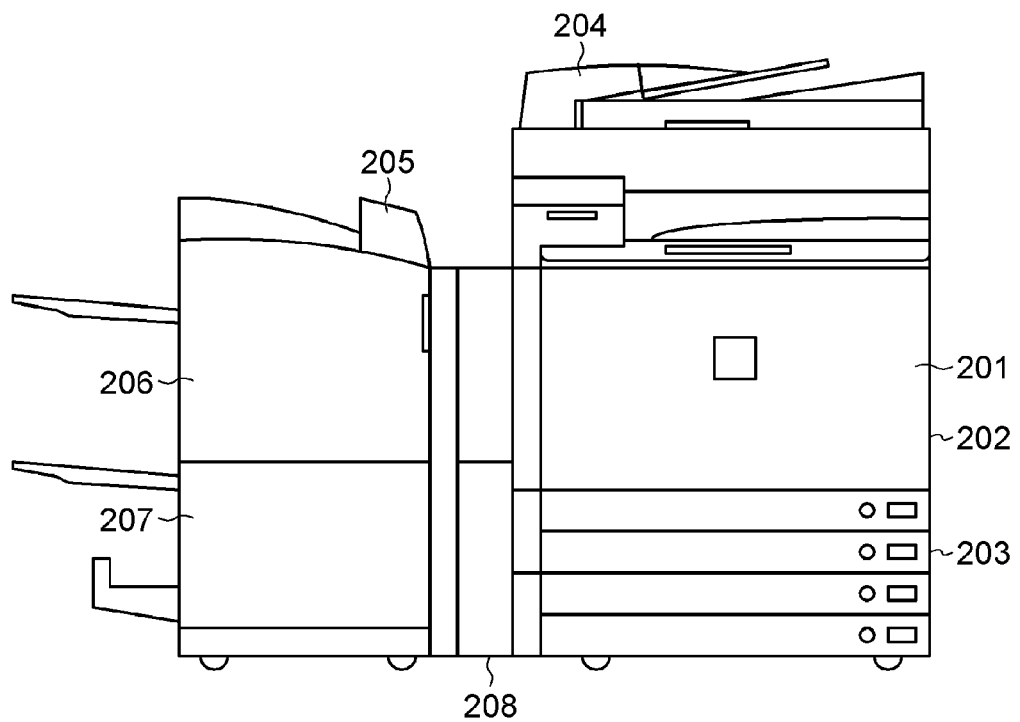
FIGS. 2A and 2B illustrate an example of a structure of an image forming apparatus.
Figure 2B:
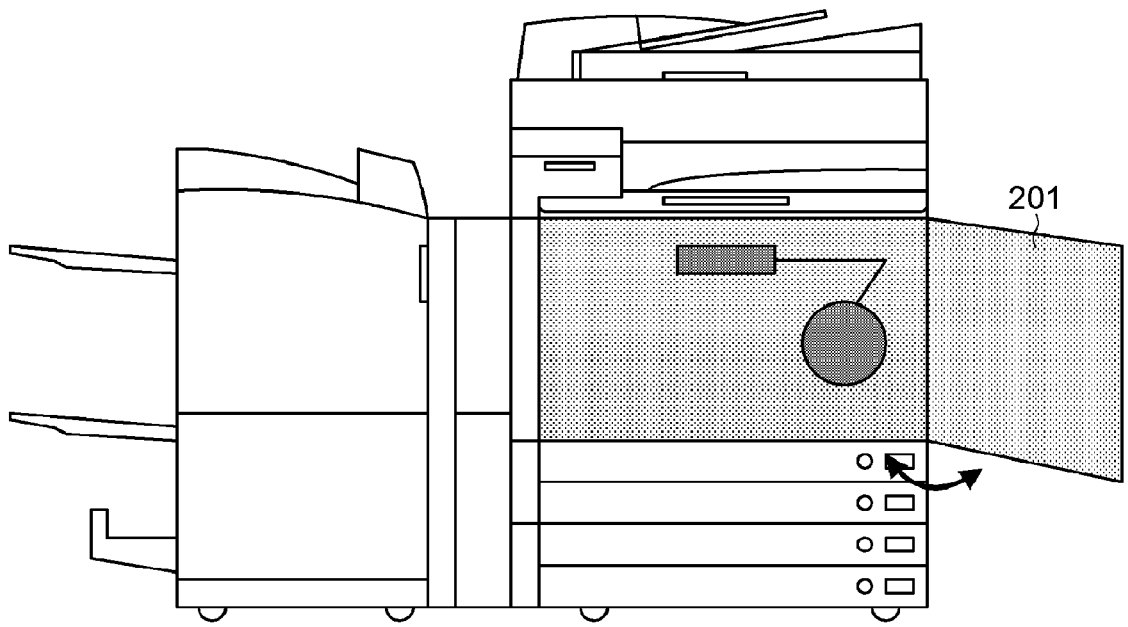

FIGS. 2A and 2B illustrate a structure of a typical image forming apparatus such as the image forming apparatus 102A or 102B shown in FIG. 1. More specifically, FIG. 2A illustrates a state in which a door of the image forming apparatus is closed, while FIG. 2B illustrates a state in which the door is open.

In FIGS. 2A and 2B, reference numeral 201 denotes a main front door that is openable and closable by a user or a service person as required. When the main front door 201 is in the open state, eclectic power is controlled such that the electric power cannot be turned on. The determination as to whether the main front door 201 is in the open or closed state may be performed by using a detection sensor or the like.

Reference numerals 202 and 203 respectively denote an upper right door and a lower right door. Reference numeral 204 denotes a feeder cover. Reference numeral 205 denotes a finisher upper-cover. Reference numeral 206 denotes a finisher front cover. Reference numeral 207 denotes a finisher lower left cover. Reference numeral 208 denotes a lower left door. Each door has a detection sensor that allows the controller of the image forming apparatus 102 to detect whether the door (or the cover) is in the open or closed state.

Figure 3:
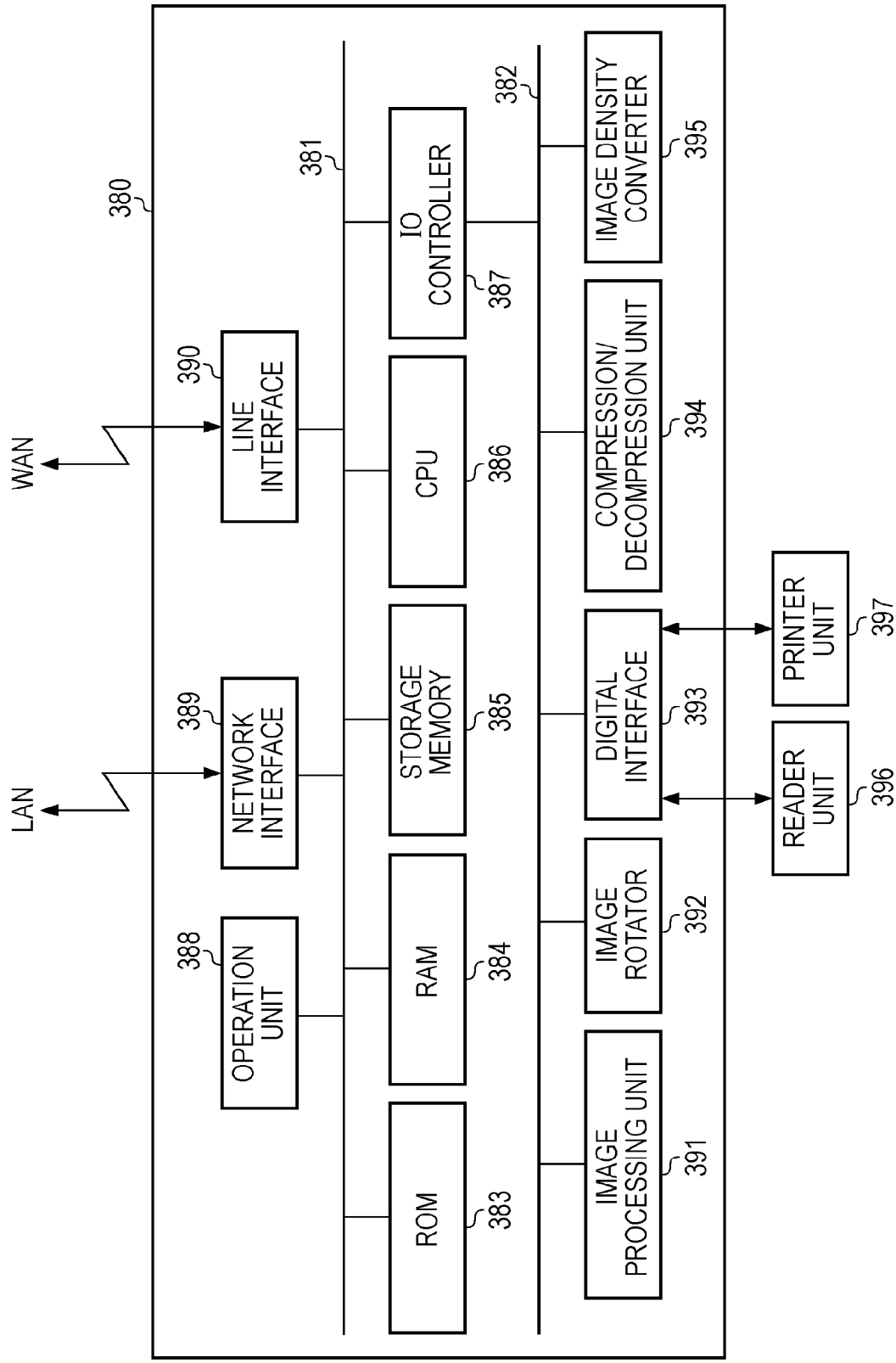
FIG. 3 is a block diagram illustrating an example of a configuration of a controller of an image forming apparatus.

FIG. 3 is a block diagram illustrating a configuration of a controller of the image forming apparatus such as the image forming apparatus 102A or 102B shown in FIG. 1.

In FIG. 3, reference numeral 380 denotes the controller responsible for controlling the operation of a reader unit 396 and a printer unit 397 and also for controlling communication using a network or a public communication line.

The controller 380 is configured to determine the open/closed state of each cover or door from the outputs from the detection sensors.

Parts in the controller 380 are connected to a system bus 381 or an image data bus 382.

In a ROM 383, a control program is stored and is executed by a CPU 386 to control the operation of the image forming apparatus 102. A RAM 384 is used as a work area in execution of the program and is also used as an image memory for temporarily storing image data.

A storage memory 385 is a memory of a nonvolatile type, and is used to store data that is necessary to be retained in the image forming apparatus 102A or 102B even after the power is turned off such that the data can be used when the image forming apparatus 102A or 102B is restarted. Examples of data that should be retained are data associated with setting of various operation modes, address data, a count value indicating the number of sheets printed, a count value indicating the number of times each part has been used, and an operation log. The storage memory 385 is also used to store error information such as information as to a service call error, jam, alarm, etc.

A network interface 389 is an interface for connection with the LAN 101. More specifically, the network interface 389 makes it possible to communicate with the proxy server 103 via the LAN 101.

A line interface 390 is connected to a communication line such as an ISDN or a public telephone network and is controlled according to a communication control program stored in the ROM 383 so as to make it possible to communicate with a terminal at a remote location via an ISDN interface, a modem, NCU (Network Control Unit), or the like.

Transmission/reception of facsimile data is also performed via this line interface 390. Note that the line interface 390 is optional, and thus the line interface 390 may be provided in none or one or both of the image forming apparatuses 102A and 102B depending on whether users thereof need a facsimile transmission function.

An operation unit 388 has a display unit and a key input unit that operate under the control of the CPU 386.

An operator is allowed to input, via the key input unit, various kinds of commands such as setting commands, operation commands, start/stop commands associated with scanning, printing, etc. The parts described above are disposed on the system bus 381.

An IO controller 387 is a bus bridge for connecting the system bus 381 to the image data bus 382 via which to transfer image data at a high speed.

The image data bus 382 may be implemented using a PCI bus or an IEE1394 bus. On the image data bus 382, various devices such as those described below are disposed.

The operation unit 388 provides a user interface as will be described below. A digital interface 393 is for connecting the reader unit 396 or the printer unit 397 of the image forming apparatus 102 to the controller 380 thereby to allow image data to be transmitted between a synchronous system and an asynchronous system. The information detected by the various sensors disposed at the various locations in the reader unit 396 and the printer unit 397 is transmitted to the system bus 381 via the digital interface 393 and further via the IO controller 387.

An image processing unit 391 is adapted to perform a correction, processing, editing, etc. on input image data or image data to be output.

An image rotator 392 is configured to rotate image data. An image compression/decompression unit 394 is configured to compress/decompress image data. More specifically, for example, multilevel image data is compressed/decompressed according to the JPEG standard, while binary image data is compressed/decompressed according to the JBIG, MMR, MR, or MH standard. An image density converter 395 performs a resolution conversion on image data to be output.

By executing the control program loaded in the RAM 384, the CPU 386 reads various kinds of information from the storage memory 385 and transmits them to the management server 106 via the network interface 389. Examples of various kinds of information include information associated with setting of various kinds of operation modes, a counter value indicating the number of sheets printed, a count value indicating the number of times each part has been used, an operation log, and error information such as information as to a service call error, jam, alarm, etc.

The CPU 386 classifies the read information into two major groups, and controls the timing of transmitting the information to the management server 106 depending on the group of the information.

One group of information is error information indicating a failure or an error that has occurred in the image forming apparatus 102. Examples of this group of information include a service call error information, jam information, alarm information, etc.

It is necessary to immediately handle such error information. Thus, the CPU 186 immediately transmits error information to the management server 106 when a failure or an error occurs.

The other group of information includes information indicating settings of respective operation modes, a count value indicating the number of sheets printed, a count value indicating the number of times each part has been used, an operation log, etc.

This group of information is transmitted periodically to the management server 106 according to a predetermined communication schedule.

A WWW (World Wide Web) server program is executed on the controller 380 such that the above-described information stored in the storage memory 385 can be viewed via a Web browser running on the client PC 108.

Figure 4:
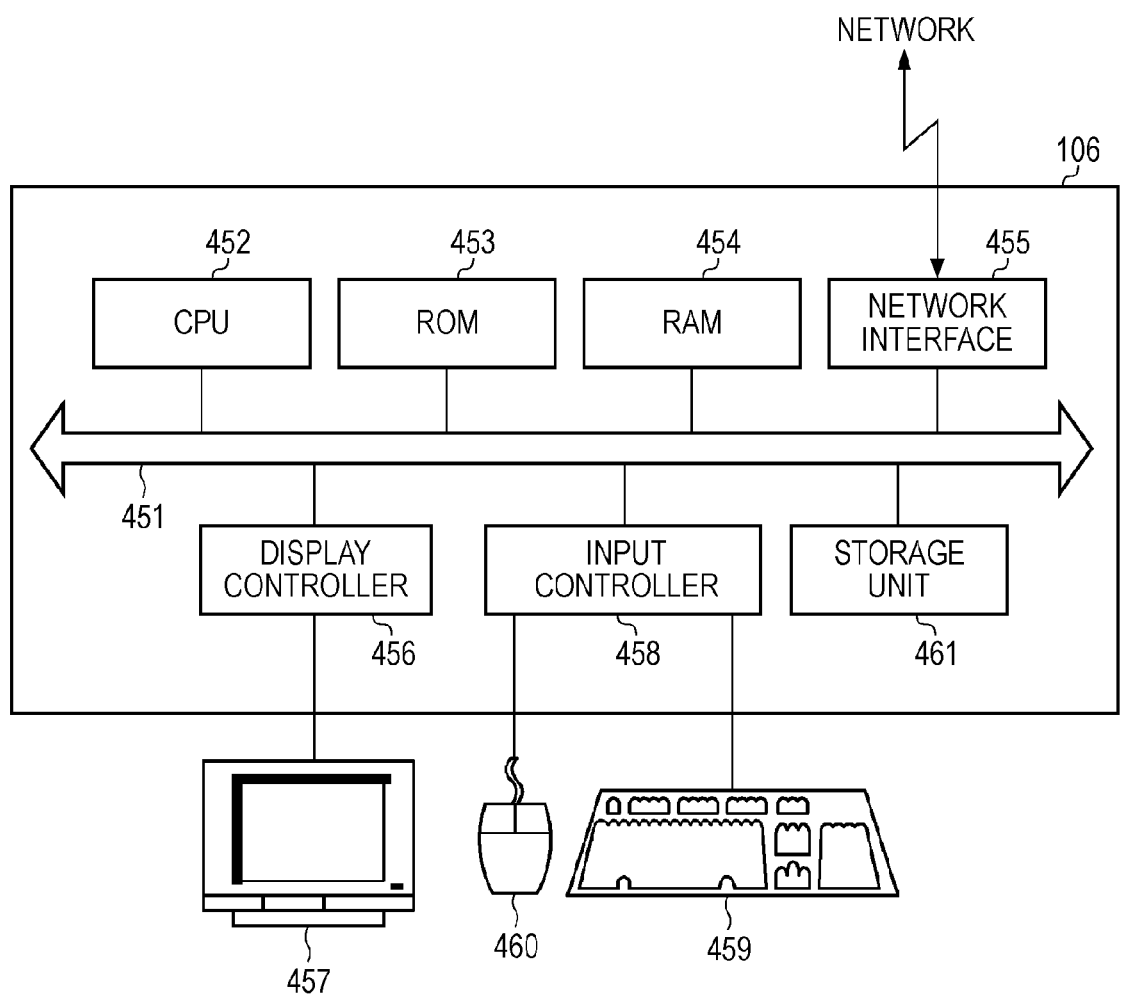
FIG. 4 is a block diagram illustrating an example of a hardware configuration of a management server.

FIG. 4 is a block diagram illustrating a hardware configuration of the management server 106 shown in FIG. 1.

In FIG. 4, a CPU 452 in the management server 106 is responsible for controlling the management server 106 and is connected to the other configuration via a system bus 451. The management server 106 is a general-purpose computer or the like. In a ROM 453, a boot program necessary to start the system is stored.

A RAM 454 is used as a work memory by the CPU 452 when the CPU 452 executes a program. A network interface 455 provides an interface with a network thereby to allow communication via the network.

A display controller 456 controls a display 457 to display information thereon such as information obtained via communication with the image forming apparatus.

Input devices 459 and 460 are operated by an operator who manages the management server 106. More specifically, the input device 460 is a pointing device, and the input device 459 is a keyboard. An input controller 458 controls the input devices 459 and 460.

The storage unit 461 stores programs executed by the CPU 452 and also stores various kinds of information such as operation information of respective devices received from the image forming apparatus 102A or 102B. The storage unit 461 may be implemented using a nonvolatile storage medium such as a magnetic disk.

The management server 106 is capable of always receiving, via the network interface 455, operation information periodically sent from the image forming apparatus 102A or 102B, error messages sent irregularly, and command requests sent from the image forming apparatus 102A or 102B.

The management server 106 is also capable of always accepting a command input by a user to change setting of the image forming apparatus 102A or 102B or an operation command, via the input controller 458.

The periodically notified operation information includes the various kinds of count values and the operation log. On the basis of the operation information, the management server 106 calculates the charge for maintenance per month to each customer such as a user of the image forming apparatus 102A or 102B.

The management server 106 outputs a report indicating a wear rate of each part of the image forming apparatus 102A or 102B relative to the maximum allowable operation limit.

When the operation information is received, the management server 106 stores the received operation information in the storage unit 461.

The operator of the management server 106 checks the operation information stored in the storage unit 461 as required, and determines how much to charge each customer.

The information irregularly transmitted for notification of an occurrence of a failure or an error in the image forming apparatus 102A or 102B includes information indicating an occurrence of a hardware failure, error/alarm information indicating an error or alarm such as jam, as well as operation information.

When the management server 106 receives information indicating an occurrence of a hardware failure or an error/alarm of a jam or the like from the image forming apparatus 102A or 102B, the management server 106 determines a process to be performed depending on urgency.

For example, if the received information is a failure notification indicating an occurrence of a failure in the image forming apparatus 102A or 102B that should be immediately handled to achieve recovery, then the management server 106 sends e-mail to an operator who manages the image forming apparatus 102A or 102B.

Furthermore, the management server 106 stores the error information indicating the failure to be handled in the storage unit 461 and displays the error information on the display 457 thereby to notify the operator that the image forming apparatus 102A or 102B has the failure.

On the other hand, in a case where the information received from the image forming apparatus 102A or 102B indicates a low-urgency error such as a jam or a similar error, the management server 106 stores the received information in the storage unit 461 and determines whether it is necessary to send e-mail or display the error information on the display 457.

The operator determines the status of the image forming apparatus 102A or 102B from the information displayed on the display 457 and requests a service person to perform a failure recovery operation as required. Depending on the status, the operator sends a consumable supply/material such as toner to a customer.

A command request from the image forming apparatus 102A or 102B is acceptable at any time. Each time the management server 106 receives a command request, the management server 106 checks the storage unit 461 disposed in the management server 106 to determine whether a command to the image forming apparatus has been set by a user. If so, the management server 106 transmits the command to the image forming apparatus 102A or 102B.

FIG. 5 illustrates an example of a status change log table 500 stored in the management server 106 shown in FIG. 1. In this example, the table describes operation mode changes and status changes in the image forming apparatus 102A or 102B and also described corresponding status codes. The status change log table is described separately for each image forming apparatus and is managed separately according to information identifying each image forming apparatus, such as an ID or S/N.

In FIG. 5, reference numeral 501 denotes a serial number of an image forming apparatus of interest. Note that a serial number is assigned to each image forming apparatus such as the image forming apparatus 102A or the image forming apparatus 102B and is managed by the management server 106. In a case where each device can be identified by a network address, an IP address or the like identifying a communication device of each image forming apparatus may be employed instead of the serial number.

Reference numeral 502 denotes a date/time at which the management server 106 receives a notification of a change in the operation mode or a change in the status, for example, of the image forming apparatus 102A. Reference numeral 503 denotes a change in the status or the operation mode of the image forming apparatus, notified to the management server 106. Examples of such changes are "door opened", "switched into a particular mode", etc.

Reference numeral 504 denotes a status code identifying the state corresponding to operation mode change/status change 503. In the present example, a change in the status of each of doors including a right door, a lower left door, and an upper right door is monitored and managed.

FIG. 6 illustrates an example of a status change-replacement part correspondence table 600 stored in the management server 106 shown in FIG. 1. In the present example, the status change-replacement part correspondence table describes the correspondence among three items: a status of the image forming apparatus 102, a replacement part, and an operation mode of the image forming apparatus 102.

In FIG. 6, reference numeral 601 denotes a status of, for example, the image forming apparatus 102A. More specifically, the information 601 described in this field of the table indicates a status such as that in which a door is opened. Reference numeral 602 denotes a status code identifying the status 601.

Reference numeral 603 denotes a replacement part name of a replacement part corresponding to the status of, for example, the image forming apparatus 102A. In the present embodiment, for example, replacement parts corresponding to the "right door opened" status are a sub station rear-left ozone filter and a sub station rear-upper ozone filter.

This indicates that the sub station rear-left ozone filter and the sub station rear-upper ozone filter are parts that were replaced when the right door was opened by a service person or user in the part replacement operation for the image forming apparatus 102A.

Reference numeral 604 denotes information indicating whether a replacement part of interest is allowed to be replaced when the image forming apparatus 102A is in the operator maintenance mode. In this field 604, a symbol O denotes that a corresponding replacement part is allowed to be replaced in the operator maintenance mode. On the other hand, a symbol x denotes that a corresponding replacement part is not allowed to be replaced in the operator maintenance mode.

Reference numeral 605 denotes information indicating whether a replacement part of interest is allowed to be replaced when the image forming apparatus 102A is in the service mode.

Reference numeral 606 denotes information indicating whether a replacement part of interest is allowed to be replaced when the image forming apparatus 102A is in the normal mode.

In the stock management system shown in FIG. 1, persons who provide service such as replacement of parts are not limited to service persons, but an administrator may be selected from users of the image forming apparatus 102A or 102B and the selected administrator may provide such service.

In this case, parts allowed to be replaced by the administrator may be limited to some of the parts that are replaced by service persons.

When the administrator performs part replacement, the administrator first switches the operation mode into the operator maintenance mode and then performs the part replacement.

On the other hand, in a case where part replacement is performed by a service person, the operation mode is first switched into the service mode and then the part replacement is performed.

That is, in the example shown in FIG. 6, information is described in the fields 604, 605, and 606 of the table to indicate whether each replacement part is allowed to be replaced in the respective modes, i.e., the operator maintenance mode, the replaceable in service mode, and the normal mode for each status.

In the present embodiment, the management server 106 manages the respective operation modes, i.e., the operator maintenance mode, the service mode, and the normal mode according to the information described in the respective fields 604, 605, and 606 of the table such as that shown in FIG. 6.

The management server 106 describes management information indicating the status change 601 in each operation mode notified from the image forming apparatus 102A or 102B in relation to replacement part information (replacement part name 603), and manages the management information as shown in FIG. 6.

FIG. 7 illustrates an example of a communication sequence performed when a part is replaced in the stock management system shown in FIG. 1.

In this example, the communication sequence is performed among a service person or a user, the image forming apparatus 102A, and the management server 106 when the service person or the user replaces a part of the image forming apparatus 102A. In FIG. 7, S701 to S714 denote step numbers. Note that although the part is replaced for the image forming apparatus 102A in this example, a similar communication sequence is performed when a part is replaced for other image forming apparatus such as the image forming apparatus 102B.

In step S701, a service person or a user presses an operator maintenance mode button on the image forming apparatus 102A. In step S702, the image forming apparatus 102A notifies the management server 106 via the Internet 107 that the operation mode has been switched in step S701 to the operator maintenance mode.

In step S703, the service person or the user opens the main right door of the image forming apparatus 102A. In response, in step S704, the image forming apparatus 102A notifies the management server 106 that the right door has been opened.

Next, in step S705, the service person or the user opens the lower left door of the image forming apparatus 102A. In response, in step S706, the image forming apparatus 102A notifies the management server 106 via the Internet 107 that the lower left door has been opened.

Next, in step S707, the service person or the user opens the upper right door of the image forming apparatus 102A. In response, in step S708, the image forming apparatus 102A notifies the management server 106 via the Internet 107 that the upper right door has been opened.

Next, in step S709, the service person or the user presses a replacement part list button disposed on the operation unit 388. In a case where the operation unit 388 is realized in the form of a touch panel, the replacement part list button may be displayed as an icon.

In step S710, the image forming apparatus 102A sends a request for a replacement part list to the management server 106 via the Internet 107.

In step S711, on receiving the request, the management server 106 produces a replacement part list by performing a predetermined process and transmits the produced replacement part list to the image forming apparatus 102A. The process of producing the replacement part list will be described in further detail below.

In step S712, the image forming apparatus 102A displays the replacement part list received in step S711 on the display unit of the operation unit 388.

Next, in step S713, the service person or the user selects an actually replaced part in the replacement part list displayed on the display unit of the operation unit 388, and then presses a replacement button. In response, in step S714, the image forming apparatus 102A sends a part replacement notification to the management server 106 via the Internet 107. The management server 106 updates data indicating the number of stocked parts in accordance with the received part replacement notification.

Figure 8:
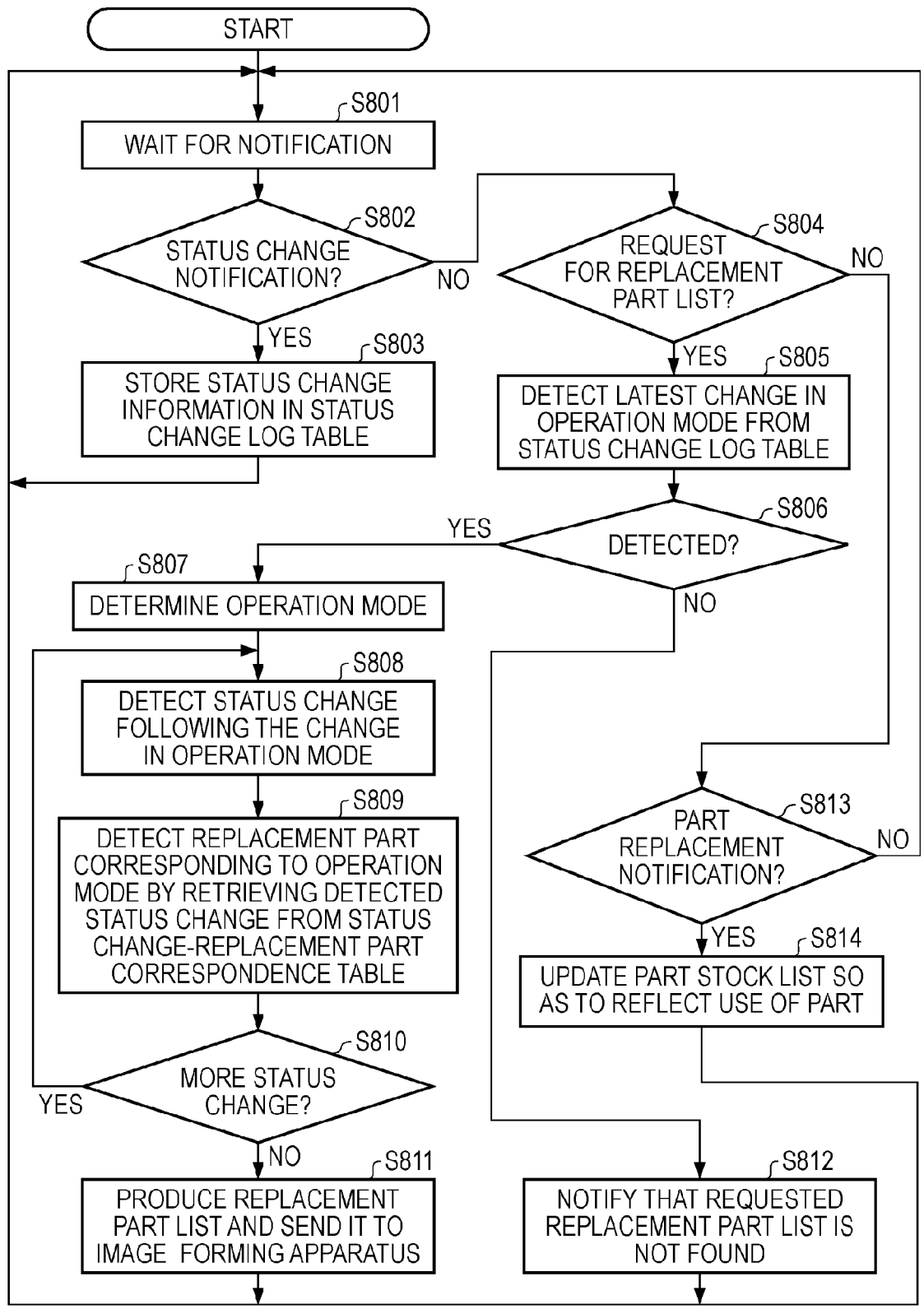
FIG. 8 is a flow chart illustrating an example of a first data processing procedure performed by a management server according to an exemplary embodiment of the present invention.

FIG. 8 is a flow chart illustrating an example of a first data processing procedure performed by the management server according to the present embodiment. In this example, the data processing procedure is performed by the management server 106 when a part of the image forming apparatus 102 is replaced by the service person or the user in the operator maintenance mode.

In FIG. 8, S801 to S814 denote step numbers. The steps in FIG. 8 are performed by the CPU 452 of the management server 106 by loading a control program into the RAM 454 and executing it.

In step S801, the management server 106 waits for a notification to be received from the image forming apparatus 102. In step S802, the management server 106 determines whether a notification from the image forming apparatus 102 indicates an occurrence of a status change. In a case where the determination made by the management server 106 is that the notification from the image forming apparatus 102 is a status change notification, then, in step S803, the management server 106 writes the change in the status in the status change log table 500, such as that shown in FIG. 5, stored in the management server 106. Thereafter, the process returns to step S801 to again wait for a notification to be received from the image forming apparatus 102.

On the other hand, in a case where the determination made in step S802 by the management server 106 is that the notification from the image forming apparatus 102 is not a status change notification, then, in step S804, the management server 106 determines whether the notification from the image forming apparatus 102 is a request for a replacement part list. In a case where the determination made in step S804 by the management server 106 is that the notification from the image forming apparatus 102 is the request for the replacement part list, the process proceeds to step S805.

In step S805, the management server 106 searches the status change log table 500 such as that shown in FIG. 5 to detect a latest change in the operation mode from all status changes written in the table.

In step S806, the management server 106 determines whether a change in the operation mode has been detected as a result of the search in step S805. In a case where the determination made by the management server 106 is that a change in the operation mode is found in the status change log table 500, the process proceeds to step S807. In step S807, the management server 106 determines the detected operation mode.

In this specific example, the management server 106 makes the determination based on the status change log table 500 shown in FIG. 5 as follows.

In the example shown in FIG. 5, a record indicates that a status change "switched into operator maintenance mode" (as indicated in the status change field 503) with a status code "02010000" (as indicated in the status code field 504) occurred at a date/time "12/15/2006 13:20" (as indicated in the date/time field 502). Thus, the management server 106 determines in step S807 that the operation mode is the "operator maintenance mode".

Thereafter, in step S808, the management server 106 further examines the status change log table to detect a status change following the change in the operation mode detected in step S805.

In the present example, from the status change log table 500 shown in FIG. 5, the management server 106 detects that a status change "right door opened" (as indicated in the status change field 503) with a status code "03030004" (as indicated in the status code field 504) occurred at a date/time "12/15/2006 13:27" (as indicated in the date/time field 502).

Next, in step S809, from the status change-replacement part correspondence table 600 shown in FIG. 6, the management server 106 selects replacement part names 603 corresponding to the status change detected in step S808 and the operation mode detected in step S807.

In the present example, the detected status change is "right door opened" (as indicated in the status change field 601) and the operation mode detected in step S807 is "operator maintenance mode", and thus the replacement part names are ones that are allowed to be replaced in the operator maintenance mode as indicated in the field 604.

On the basis of the information described above, the management server 106 selects, as the replacement part names, the "sub station rear-left ozone filter" and the "sub station rear-upper ozone filter" as the replacement part names 603 as indicated in the replacement part name field 603.

Next, in step S810, the management server 106 checks the status change log table to determine whether a further status change occurred after the status change detected in step S808.

In the present example, the status change log table 500 shown in FIG. 5 indicates that a status change "lower left door opened" occurred after the status change "right door opened" described above.

Therefore, a further status change is detected in step S810, and thus the process returns to step S808 to again perform the process described above to select a replacement part corresponding to the detected status change and the operation mode.

In the present example, the status changes 601 described in the table include right door opened", "left door opened", and "upper right door opened", and thus replacement part names 603 are selected according to the information described in the "replaceable in operator maintenance mode" field 604 as described below. That is, the replacement parts selected in this case according to the "replacement part name" field 603 are "sub station rear-left ozone filter", "sub station rear-upper ozone filter", "first fixing refresh roller", "second fixing refresh roller", and "second transfer cleaner kit" (see FIG. 11).

Figure 12:
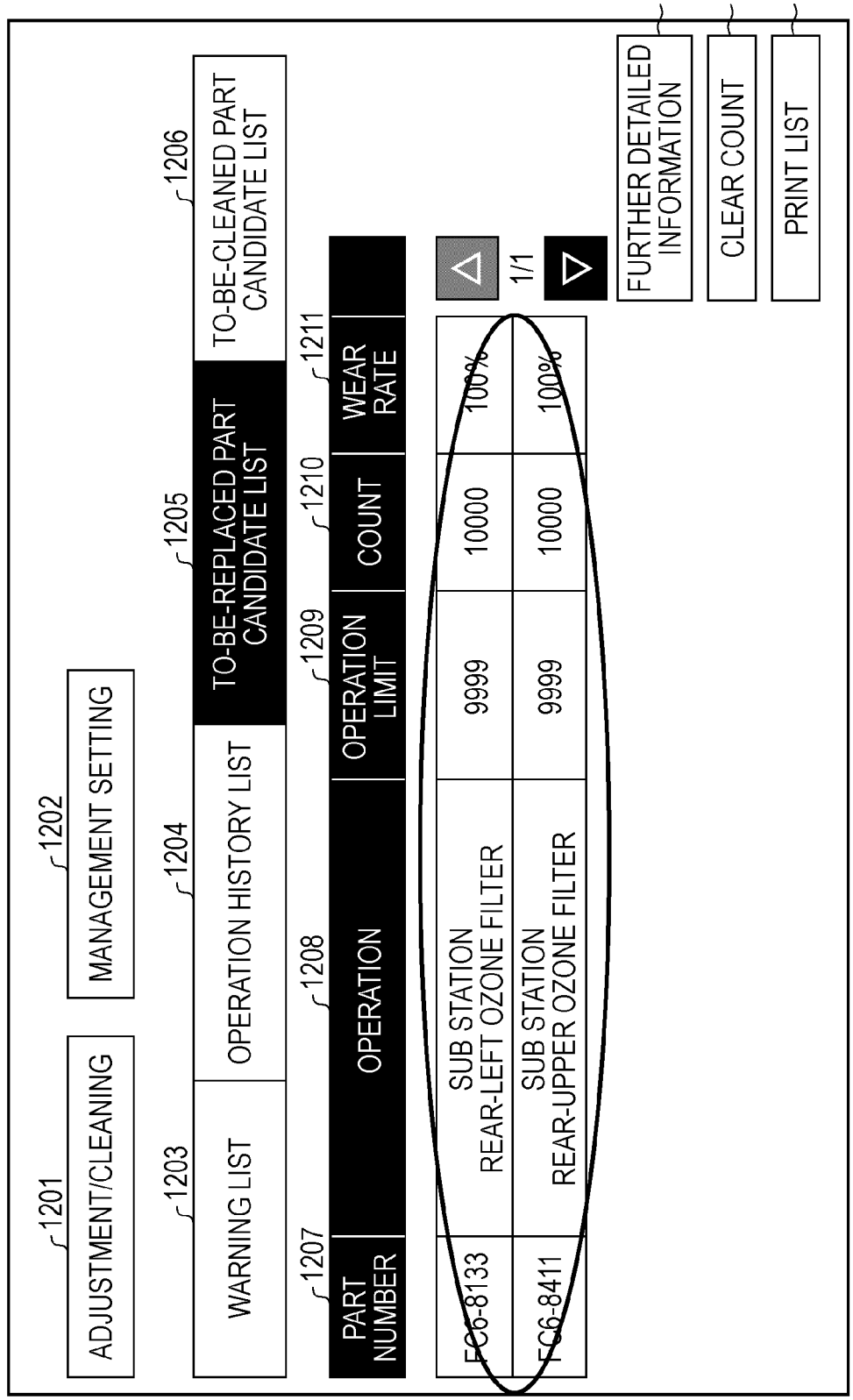
FIG. 12 illustrates an example of a user interface displayed on a display unit of an operation unit of an image forming apparatus.

If the operation mode is not the "operator maintenance mode" but the "service mode", then, according to the description in the "replaceable in service mode" field 605, "sub station rear-left ozone filter" and "sub station rear-upper ozone filter" are selected as replacement parts corresponding to status changes "right door opened", "lower left opened", and "upper right opened" described in the "status change" field 601 (see FIG. 12).

Next, in step S811, the management server 106 produces a list of the selected replacement parts and transmit it to the image forming apparatus 102. The process then returns to step S801.

On the other hand, in a case where the determination made in step S806 by the management server 106 is that no seeking operation mode change is found in the status change log table, then, in step S812, the management server 106 notifies the image forming apparatus 102 that the requested list of replacement parts is not found. Thereafter, the process returns to step S801. In step S801, the management server 106 again waits for a notification to be received from the image forming apparatus 102.

In a case where the determination made in step S804 by the management server 106 is that the notification received from the image forming apparatus 102 is not a request for a replacement part list, then, in step S813, the management server 106 determines whether the notification from the image forming apparatus 102 is a part replacement notification. In a case where the management server 106 determines that the notification from the image forming apparatus 102 is a part replacement notification, then, in step S814, the management server 106 updates data indicating the number of stocked parts in accordance with the received part replacement notification. The process then returns to step S801.

The updating of the data associated with the stocks of parts is performed as follows. When the management server 106 receives a part replacement notification, the management server 106 updates the data indicating the number of stocked parts corresponding to the replaced part so as to correctly indicate the current number of stocked parts.

On the other hand, in a case where management server 106 determines in step S813 that the notification from the image forming apparatus 102 is not a part replacement notification, management server 106 again waits for a notification to be received from the image forming apparatus 102.

The management server 106 may be adapted such that when the produced replacement part list is sent to the image forming apparatus 102, information indicating an instruction of an operation to be performed next by the service person in the current status may be produced and may be sent to the image forming apparatus 102 together with the produced replacement part list.

For example, when the upper door is opened, the management server 106 may send an operation instruction to the service person to inform that the upper right door is openable.

Figure 9:
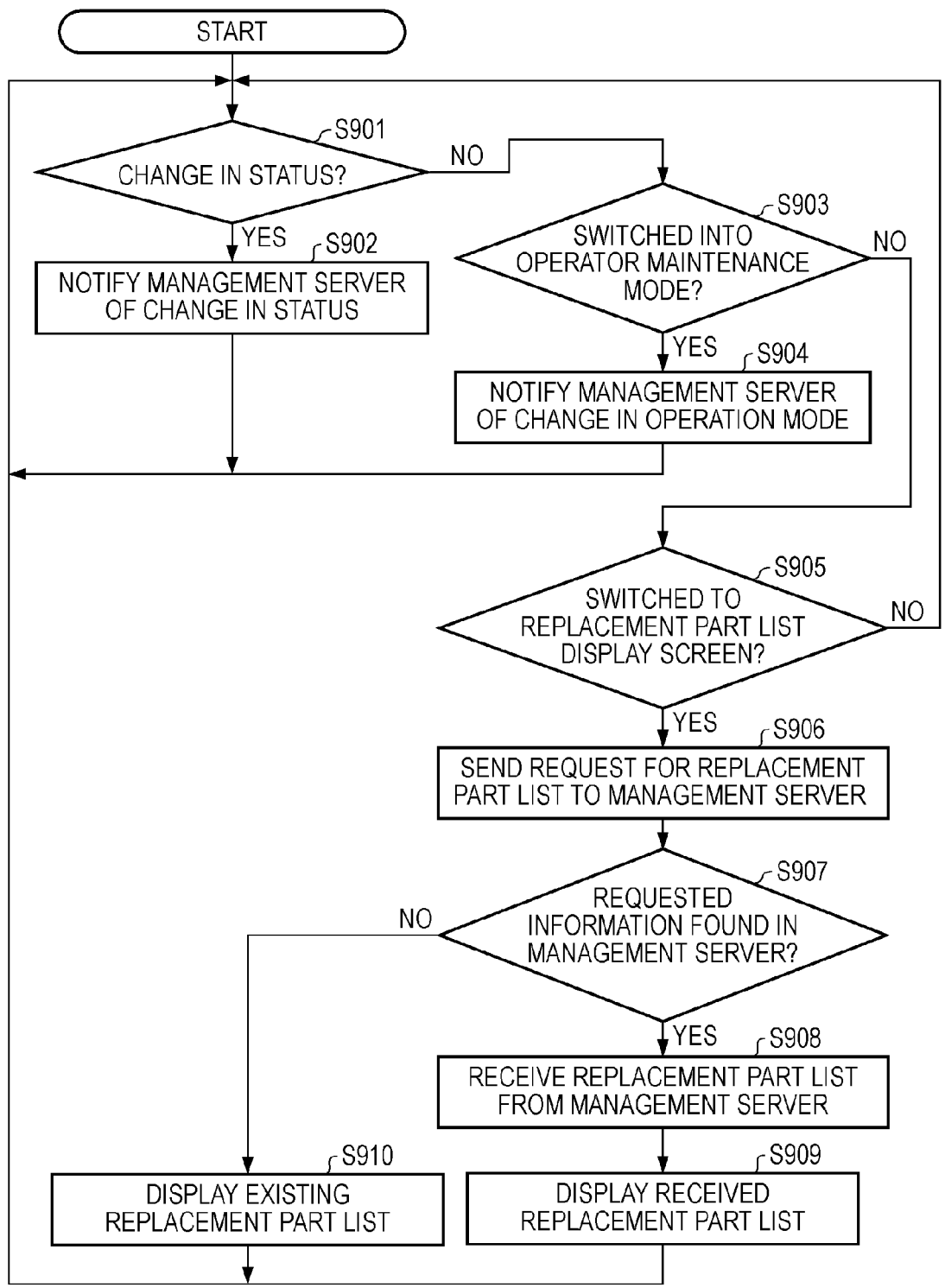
FIG. 9 is a flow chart illustrating an example of a first data processing procedure performed by an image forming apparatus according to an exemplary embodiment of the present invention.

FIG. 9 is a flow chart illustrating an example of a first data processing procedure performed in the image forming apparatus according to a present embodiment. In this example, the data processing procedure is a procedure performed by the image forming apparatus 102 to display replacement parts. More specifically, this procedure is performed by the image forming apparatus 102 when a service person or a user operates the operation unit 388 of the image forming apparatus 102 to switch the operation mode into the operator maintenance mode and replaces a part.

In FIG. 9, S901 to S910 denote step numbers. The steps in FIG. 9 are performed by the CPU 386 shown in FIG. 3 by loading a control program into the RAM 384 and executing it.

First, in step S901, the CPU 386 determines whether a change has occurred in the status of the image forming apparatus 102. In a case where the CPU 386 determines that a change in the status has occurred, then, in step S902, the CPU 386 notifies the management server 106 of the status change. The process then returns to step S901.

On the other hand, in a case where the CPU 386 determines in step S901 that no change has occurred in the status in the image forming apparatus 102, then, in step S903, the CPU 386 determines whether the operation mode of the image forming apparatus 102 has changed into the operator maintenance mode. If the CPU 386 determines that the operation mode of the image forming apparatus 102 has changed into the operator maintenance mode, then, in step S904, the CPU 386 notifies the management server 106 of the change in the operation mode. The process then returns to step S901.

On the other hand, in a case where the determination made in step S903 by the CPU 386 is that the operation mode of the image forming apparatus 102 has not changed into the operator maintenance mode, then, in step S905, the CPU 386 determines whether the screen has been switched to a replacement part list display screen. If the CPU 386 determines that the screen has been switched to the replacement part list display screen, then, in step S906, the CPU 386 requests the management server 106 to provide a replacement part list.

In step S907, the CPU 386 analyzes a response received from the management server 106 to determine whether the management server 106 has information associated with the list of replacement parts requested by the CPU 386. In a case where the CPU 386 determines that the management server 106 has information associated with the list of replacement parts requested by the CPU 386, then, in step S908, the CPU 386 receives the list of replacement parts from the management server 106.

Next, in step S909, the CPU 386 displays the list of replacement parts received in step S908 on the display unit of the operation unit 388 of the image forming apparatus 102. The process then returns to step S901.

In the present example, the list of replacement parts is displayed on the screen of the image forming apparatus 102 as described below with reference to FIGS. 11 and 12.

On the other hand, in a case where the CPU 386 determines in step S907 that the management server 106 does not have information associated with the list of replacement parts requested by the CPU 386, the process proceeds to step S910. In step S910, the CPU 386 displays an existing list of replacement parts stored in the image forming apparatus 102 on the display unit of the operation unit 388. The process then returns to step S901.

Figure 10:
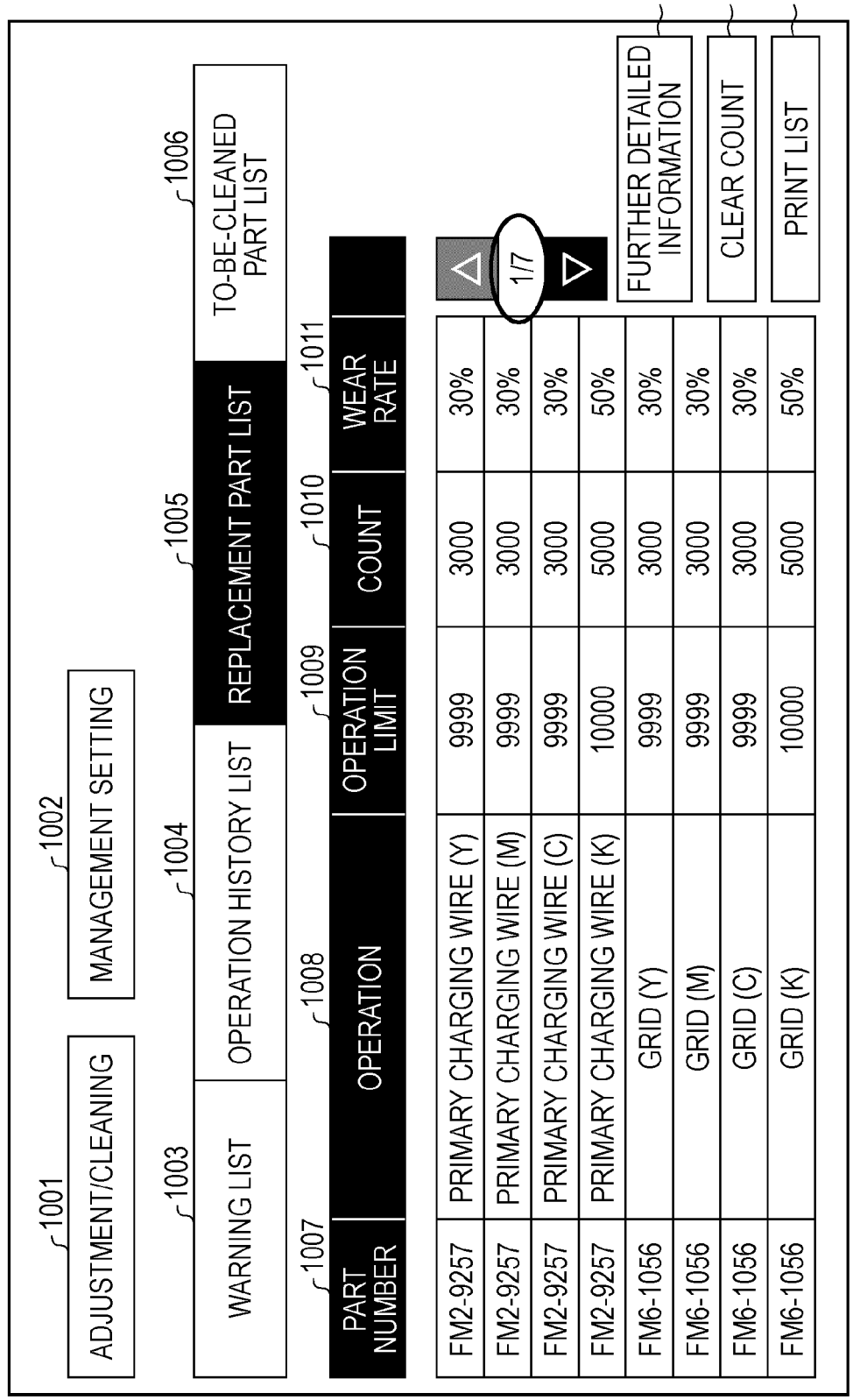
FIG. 10 illustrates an example of a user interface displayed on a display unit of an operation unit of an image forming apparatus.

FIG. 10 illustrates an example of a user interface displayed on the display unit of the operation unit 388 of the image forming apparatus 102 shown in FIG. 1. In this example, an existing list of replacement parts stored in the image forming apparatus 102 is displayed on the display unit of the operation unit 388.

In FIG. 10, reference numeral 1001 denotes an adjustment/cleaning button that is pressed when an adjustment/cleaning of the image forming apparatus 102 is performed, for example, in terms of density uniformity, cleaning of wires, or calibration of a printer unit. Reference numeral 1002 denotes a management setting button that is pressed when setting is performed in terms of, for example, a password that is requested to be input when the operation mode is switched into the operator maintenance mode.

Reference numeral 1003 denotes a warning list button that is pressed to display a list of parts whose wear rate is greater than 100%. Reference numeral 1004 denotes an operation history list button used to display a list of parts replaced by a service person (user) including information indicating a date/time at which each part was replaced by the service person (the user), the name of the part, and the part number.

Reference numeral 1005 denotes a replacement part list button used to display, in the form of a list, parts together with part numbers 1007, operations 1008, maximum operation limits 1009, counts 1010, and wear rates 1011.

Reference numeral 1006 denotes a cleaning part list button used to display, in the form of a list, parts to be cleaned, together with part numbers 1007, operations 1008, maximum operation limits 1009, counts 1010, and wear rates 1011.

Reference numeral 1007 denotes a part number of each replacement part. Reference numeral 1008 denotes an operation corresponding to the part name of the part. Reference numeral 1009 denotes a maximum operation limit (operating life) of each part. For example, "9999" indicates that an operating life of a part expires when it has been used to print 9999 sheets.

Reference numeral 1010 denotes a counter that has a counter value for each replacement part. The counter value is incremented each time printing is performed. Reference numeral 1011 denotes a wear rate of each replacement part. The wear rate is calculated from the current count value 1010 and the maximum operation limit 1009 according to the following formula.

$$\text{Wear rate 1011} = (\text{counter value 1010})/(\text{maximum operation limit 1009})$$

Reference numeral 1012 denotes a button used to display further detailed information. After a replacement part is selected, if this detailed information button is pressed, detailed information is displayed as to, for example, the date/time when the part was replaced, the counter value as of when the part was replaced, and the wear rate as of the part was replaced.

Reference numeral 1013 denotes a counter clear button used to clear the count value for a selected part.

When an operation of replacing a part by a service person or a user is completed, the service person or the user selects the replaced part from a list displayed when the replacement part list button 1005 or the to-be-cleaned part list button 1006 is pressed, and the service person or the user then presses the counter clear button 1013. In response, the CPU 386 clears the count value for the selected part and notifies the management server 106 that the part has been replaced.

Reference numeral 1014 denotes a list print button used to print a list selected by the warning list button 1003, the operation history list button 1004, the replacement part list button 1005, or the to-be-cleaned part list button 1006.

Figure 11:
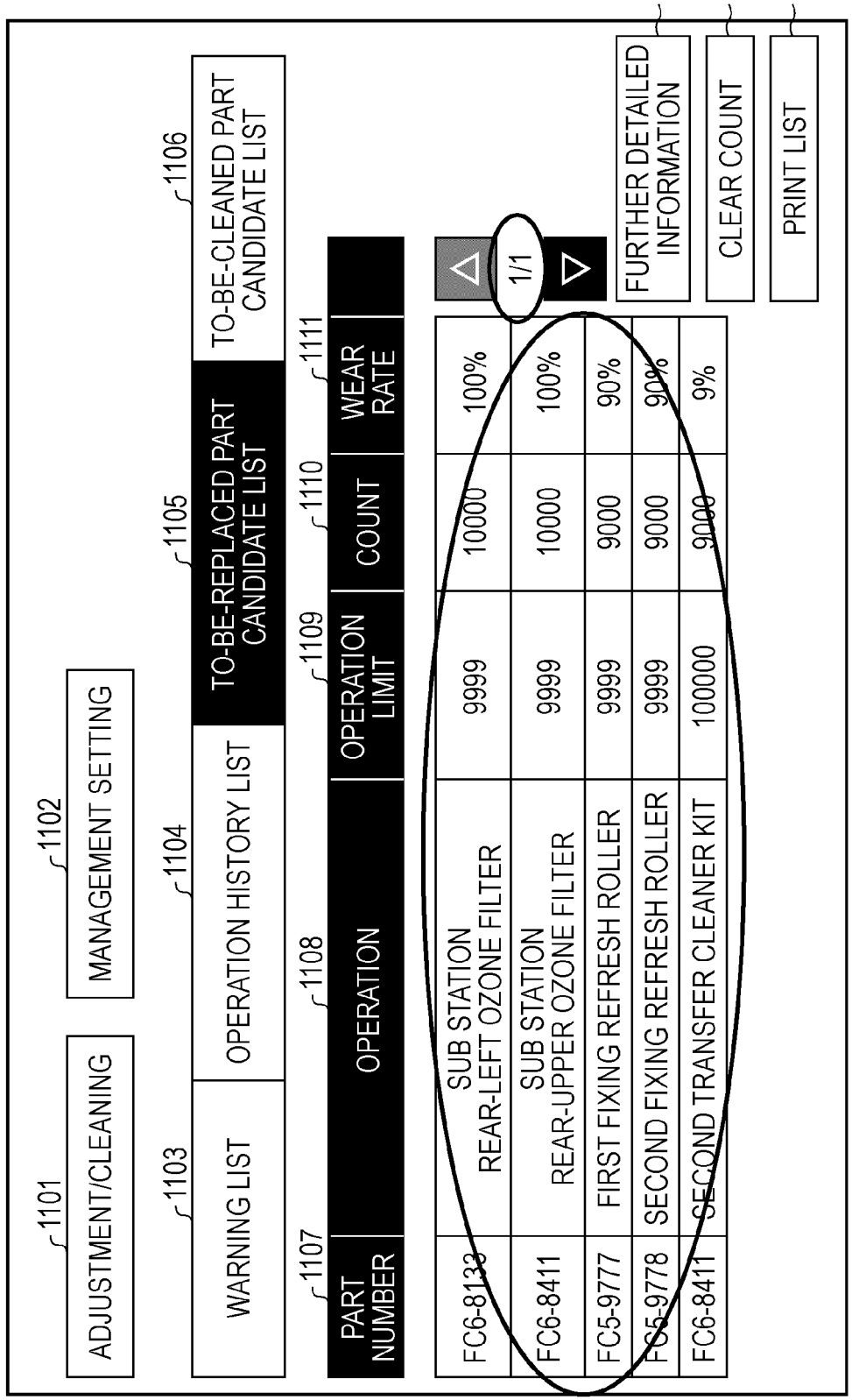
FIG. 11 illustrates an example of a user interface displayed on a display unit of an operation unit of an image forming apparatus.

FIG. 11 illustrates an example of a user interface displayed on the display unit of the operation unit 388 of the image forming apparatus 102 shown in FIG. 1. In this example, a replacement part list received from the management server 106 is displayed. Note that in this example, it is assumed that the operation mode is the "operator maintenance mode". This list is displayed such that the image forming apparatus 102 acquires a replacement part list transmitted from the management server 106 and displays the acquired replacement part list on the operation unit 388 under the control of the CPU 386 of the image forming apparatus 102. Note that the replacement parts described in this replacement part list have been narrowed down in accordance with operations/commands performed/input by the service person on/in the image forming apparatus 102, the order of opening/closing doors, and the order of detaching/attaching parts. The operations/commands include operations of opening/closing doors and operations detaching/attaching parts.

The locations of the respective parts vary depending on the specifications of the specific image forming apparatus, and the order of displaying parts in the list can vary depending on the operations/commands performed/input by the service person. Despite such possible variations, only replacement parts adapted to the current state resulting from the operations/commands are displayed as the replacement part list on the operation unit 388.

In FIG. 11, reference numeral 1101 denotes an adjustment/cleaning button that is pressed when an adjustment/cleaning of the image forming apparatus 102 is performed, for example, as to density uniformity, cleaning of wires, calibration of a printer unit.

Reference numeral 1102 denotes a management setting button that is pressed when setting is performed, for example, as to a password that is requested to be input when the operation mode is switched into the operator maintenance mode.

Reference numeral 1103 denotes a warning list button that is pressed to display a list of parts whose wear rate is greater than 100%. Reference numeral 1104 denotes an operation history list button used to display a list of parts replaced by a service person (user) including information indicating a date/time at which each part was replaced by the service person (the user) the name of the part, and the part number.

Reference numeral 1105 denotes a replacement part candidate list button used to display, in the form of a list, parts together with part numbers 1107, operations 1108, maximum operation limits 1109, counts 1110, and wear rates 1111.

Reference numeral 1106 denotes a to-be-cleaned part candidate list button used to display, in the form of a list, parts to be cleaned, together with part numbers 1107, operations 1108, maximum operation limits 1109, counts 1110, and wear rates 1111.

Reference numeral 1107 denotes a part number of each replacement part. Reference numeral 1108 denotes an operation corresponding to the part name of the part. Reference numeral 1109 denotes a maximum operation limit (operating life) of each part. For example, "9999" indicates that an operating life of a part expires when it has been used to print 9999 sheets.

Reference numeral 1110 denotes a counter that has a counter value for each replacement part. The counter value is incremented each time printing is performed. Reference numeral 1111 denotes a wear rate of each replacement part. The wear rate is calculated from the current count value 1110 and the maximum operation limit 1109 according to the following formula.

$$\text{Wear rate 1111} = (\text{counter value 1110})/(\text{maximum operation limit 1109})$$

Reference numeral 1112 denotes a button used to display further detailed information. After a replacement part is selected, if this detailed information button is pressed, detailed information is displayed as to, for example, the date/time when the part was replaced, the counter value as of when the part was replaced, and the wear rate as of the part was replaced.

Reference numeral 1113 denotes a counter clear button used to clear the count value for a selected part. When an operation of replacing a part by a service person (or a user) is completed, the service person (or the user) selects the replaced part from a list displayed when the replacement part candidate list button 1105 or the to-be-cleaned part list 1106 is pressed, and the service person (or the user) then presses the counter clear button 1013. In response, the CPU 386 clears the count value for the selected part and notifies the management server 116 that the part has been replaced.

Reference numeral 1114 denotes a list print button used to print a list selected by a warning list button 1103, an operation history list button 1104, a replacement part candidate list button 1105, or a to-be-cleaned part list button 1106.

FIG. 12 illustrates an example of a user interface displayed on the display unit of the operation unit 388 of the image forming apparatus 102 shown in FIG. 1. In this example, a replacement part list received from the management server 106 is displayed. Note that in this example, it is assumed that the operation mode is the "service mode". This list is displayed such that the image forming apparatus 102 acquires a replacement part list transmitted from the management server 106 and displays the acquired replacement part list on the operation unit 388 under the control of the CPU 386 of the image forming apparatus 102.

In FIG. 12, reference numeral 1201 denotes an adjustment/cleaning button that is pressed when an adjustment/cleaning of the image forming apparatus 102 is performed, for example, in terms of density uniformity, cleaning of wires, or calibration of a printer unit.

Reference numeral 1202 denotes a management setting button that is pressed when setting is performed, for example, as to a password that is requested to be input when the operation mode is switched into the operator maintenance mode.

Reference numeral 1203 denotes a warning list button that is pressed to display a list of parts whose wear rate is greater than 100%. Reference numeral 1204 denotes an operation history list button used to display a list of parts replaced by a service person (user) including information indicating a date/time at which each part was replaced by the service person (the user) the name of the part, and the part number.

Reference numeral 1205 denotes a replacement part candidate list button used to display, in the form of a list, parts together with part numbers 1207, operations 1208, maximum operation limits 1209, counts 1210, and wear rates 1211.

Reference numeral 1206 denotes a to-be-cleaned part candidate list button used to display, in the form of a list, parts to be cleaned, together with together with part numbers 1207, operations 1208, maximum operation limits 1209, counts 1210, and wear rates 1211.

Reference numeral 1207 denotes a part number of each replacement part. Reference numeral 1208 denotes an operation corresponding to the part name of the part. Reference numeral 1209 denotes a maximum operation limit (operating life) of each part. For example, "9999" indicates that an operating life of a part expires when it has been used to print 9999 sheets.

Reference numeral 1210 denotes a counter that has a counter value for each replacement part. The counter value is incremented each time printing is performed. Reference numeral 1211 denotes a wear rate of each replacement part. The wear rate is calculated from the current count value 1210 and the maximum operation limit 1209 according to the following formula.

Wear rate 1211=(counter value 1210)/(maximum operation limit 1209)

Reference numeral 1212 denotes a button used to display further detailed information. After a replacement part is selected, if this detailed information button is pressed, detailed information is displayed as to, for example, the date/time when the part was replaced, the count value as of when the part was replaced, and the wear rate as of the part was replaced.

Reference numeral 1213 denotes a counter clear button used to clear the count value for a selected part. When an operation of replacing a part by a service person (or a user) is completed, the service person (or the user) selects the replaced part from a list displayed when the replacement part candidate list button 1205 or the to-be-cleaned part list 1206 is pressed, and the service person (or the user) then presses the counter clear button 1213. In response, the CPU 386 clears the count value for the selected part and notifies the management server 116 that the part has been replaced.

Reference numeral 1214 denotes a list print button used to print a list selected by a warning list button 1203, an operation history list button 1204, a replacement part candidate list button 1205, or a to-be-cleaned part list 1206.

In a case of the previous example, when a service person or a user presses the replacement part list button 1005 on the image forming apparatus 102, a replacement part list such as that shown in FIG. 10 is displayed as shown in FIGS. 11 and 12.

In contrast, in the present example, as described above, when a service person or a user presses the replacement part candidate list button 1105, the replacement part list is narrowed down and the resultant list including only candidates for replacement parts is displayed. This prevents a wrong part from being selected by mistake, and thus it becomes possible to accurately manage parts.

In the present embodiment, by way of example but not limitation, the part replacement operation has been described above as well as the configuration of the image forming apparatus, the control process, the information table, and the processing flow.

Second Exemplary Embodiment

In the first embodiment described above, in the process performed by the management server 106 shown in FIG. 7, all status changes notified from the image forming apparatus 102 are stored in the status change log table.

However, in order for the management server 106 to manage all status changes notified from the image forming apparatus 102, a large memory capacity is needed, which results in an increase in cost.

In the present embodiment, to avoid the above problem, all status changes notified of from the image forming apparatus 102 are not stored in the status change log table, but only necessary status changes are stored so as to achieve high efficiency in use of the memory space, as described in detail below.

Figure 13:
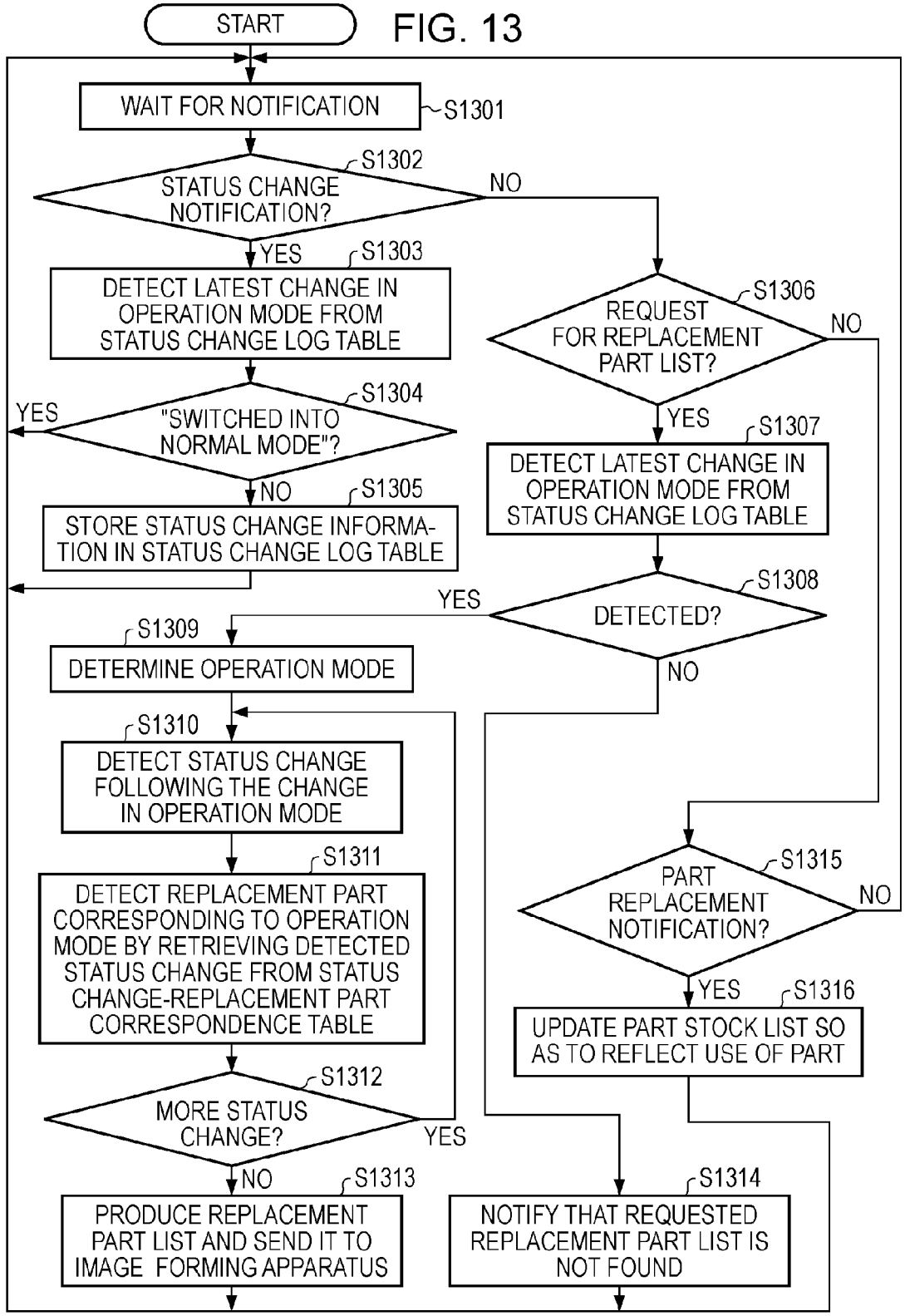
FIG. 13 is a flow chart illustrating an example of a second data processing procedure performed by a management server according to an exemplary embodiment of the present invention.

FIG. 13 is a flow chart illustrating an example of a second data processing procedure performed in the management server according to the present embodiment. In this example of the second data processing procedure, the management server 106 produces a replacement part list and transmits the produced replacement part list. In FIG. 13, S1301 to S1316 denote step numbers. The steps in FIG. 13 are performed by the CPU 452 of the management server 106 by loading a control program into the RAM 454 and executing it.

Steps S1306 to S1316 are similar to steps S804 to S814 shown in FIG. 8, and thus a further description thereof is omitted herein.

In step S1301, the management server 106 waits for a notification to be received from the image forming apparatus 102. Next, in step S1302, the CPU 452 determines whether a notification from the image forming apparatus 102 indicates an occurrence of a status change. In a case where the determination made by the CPU 452 is that the notification from the image forming apparatus 102 is a status change notification, the process proceeds to step S1303. In step S1303, the CPU 452 searches the status change log table stored in the management server 106 to detect a latest change in the operation mode from all status changes written in the table.

In step S1304, the CPU 452 determines whether "switched into normal mode" is detected as a result of the search for the latest change in the operation mode. If "switched into normal mode" is detected, the CPU 452 returns the process to step S1301 without writing the status change notified from the image forming apparatus 102 in the status change log table. In step S1301, the CPU 452 again waits for a notification to be received from the image forming apparatus 102.

On the other hand, in a case where the result in step S1303 indicates that the detected latest change in the operation mode is not "switched into normal mode", then, in S1305, the CPU 452 writes the status change in the status change log table stored in the management server 106. Thereafter, the process returns to step S1301. In step S1301, the CPU 452 again waits for a notification to be received from the image forming apparatus 102.

In the second embodiment, as described above, instead of writing all status changes notified from the image forming apparatus 102 in the status change log table, only necessary status changes are written in the table thereby achieving high efficiency in use of the memory space.

In the present embodiment, an example of a processing flow has been described above for the part replacement operation. Note that the processing flow is not limited to the example described above.

Third Exemplary Embodiment

In the first embodiment described above, in the process performed in the image forming apparatus 102 shown in FIG.

8, a request for a replacement part list is sent to the management server 106 each time the replacement part list button is pressed.

Instead, in a third exemplary embodiment, a request for a replacement part list is sent to the management server 106 only when a replacement operation was actually performed by a service person (or a user) thereby to avoid unnecessary communication from being performed, as described in detail below.

Figure 14:
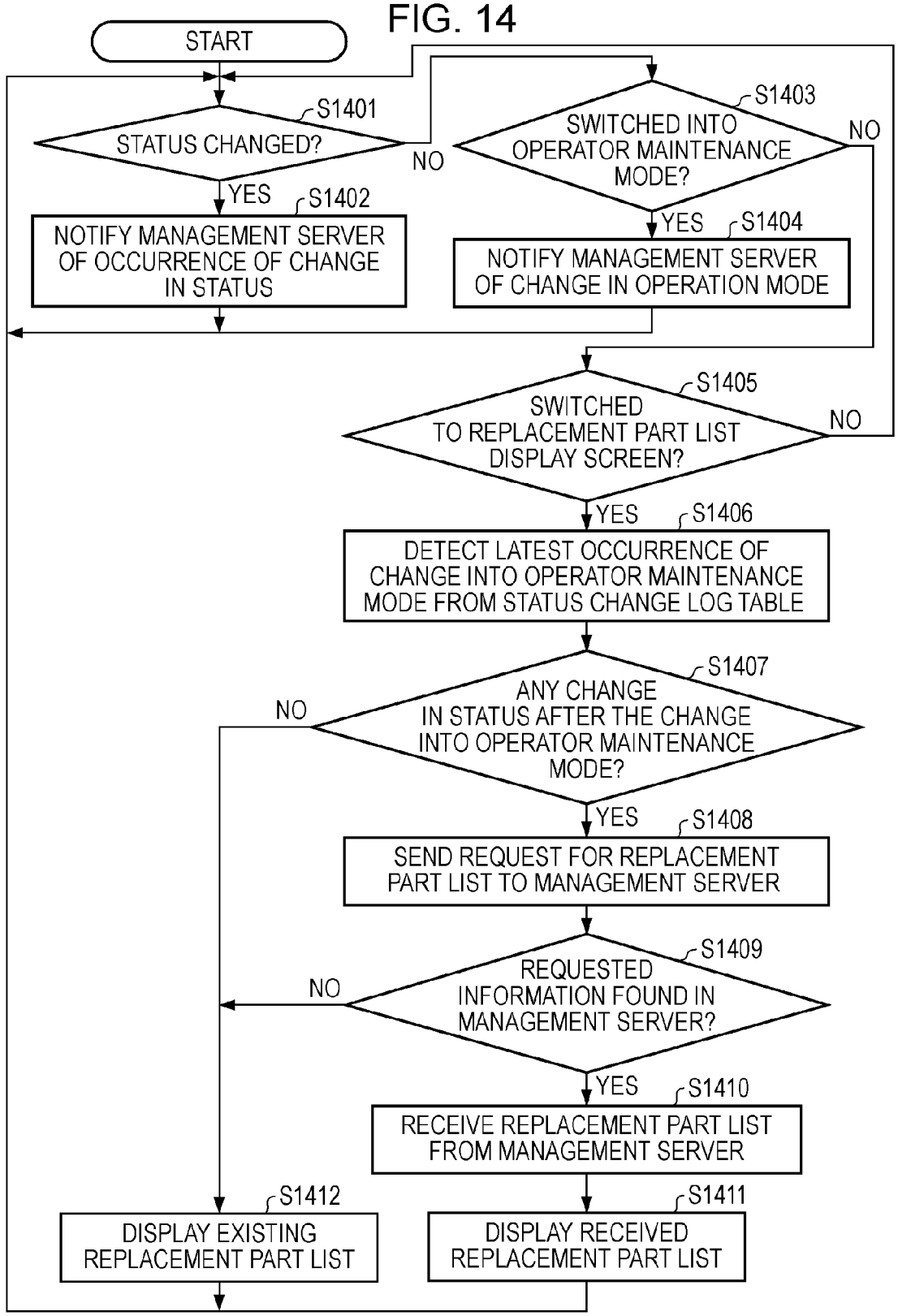
FIG. 14 is a flow chart illustrating an example of a second data processing procedure performed by an image forming apparatus according to an exemplary embodiment of the present invention.

FIG. 14 is a flow chart illustrating an example of a second data processing procedure performed by an image forming apparatus according to an exemplary embodiment of the present invention. In this example, the data processing procedure is a procedure performed by the image forming apparatus 102 to display replacement parts. More specifically, this process is performed by the image forming apparatus when a service person or a user operates the operation unit 388 of the image forming apparatus 102 to switch the operation mode to the operator maintenance mode and replaces a part.

In FIG. 14, S1401 to S1412 denote step numbers. The steps in FIG. 14 are performed by the CPU 386 shown in FIG. 3 by loading a control program into the RAM 384 and executing it. Steps S1401 to 1405 are similar to steps S901 to S905 shown in FIG. 9, and steps S1409 to S1412 are similar to steps S907 to S910 shown in FIG. 9, and thus a further description thereof is omitted herein.

In step S1405, the image forming apparatus 102 determines whether the screen has been switched to a replacement part list display screen. If it is determined that the screen has not been switched to the replacement part list display screen, the process proceeds to step S1406. In step S1406, the image forming apparatus 102 searches the status change log table described above to detect "switched into operator maintenance mode" as a latest change in the operation mode from status changes written in the status change log table.

In step S1407, the image forming apparatus 102 checks the status change log table 500 to determine whether a further status change occurred after "switched into operator maintenance mode" detected in step S1406. In a case where the image forming apparatus 102 determines that the status change log table 500 indicates that a further status change occurred after "switched into operator maintenance mode" detected in step S1406, the process proceeds to step S1408. In step S1408, the image forming apparatus 102 requests the management server 106 to provide a replacement part list. The process then proceeds to step S1409.

On the other hand, in a case where the determination made in step S1407 by the image forming apparatus 102 is that the status change log table 500 includes no further status change after "switched into operator maintenance mode" detected in step S1406, the process proceeds to step S1412. In step S1412, the image forming apparatus 102 displays an existing list of replacement parts stored in the image forming apparatus 102 on the display unit of the operation unit 388. The process then returns to step S1401.

On the other hand, if the image forming apparatus 102 determines in step S1405 that the screen has not been switched to the replacement part list display screen, the processing flow returns to S1401 to perform the process described above.

In the third embodiment, as described above, when a service person (or a user) presses the replacement part list button, the request for the replacement part list is not necessarily always sent to the management server 106. That is, only when a replacement operation was actually performed, or a particular door was opened for a replacement operation, the request for the replacement part list is sent to the management server 106. This prevents unnecessary communication from being performed, and thus it is possible to reduce the number of times communication is performed.

In the present embodiment, an example of a processing flow has been described above for the part replacement operation. Note that the processing flow is not limited to the example described above.

Fourth Exemplary Embodiment

In the previous embodiments described above, only a replacement part list corresponding to a current status is displayed as the user interface on the operation unit 388 according to the replacement part list transmitted from the management server 106.

Instead, in a fourth embodiment, item information to be displayed in a replacement part list is obtained in advance from the management server 106, and a particular group of replacement parts of interest in the list selected in accordance with the current state is displayed in a different manner from a manner in which other replacement parts are displayed, as described in detail below with reference to FIG. 11.

In the example shown in FIG. 11, a replacement part display screen is displayed such that ozone filters, fixing refresh rollers, and a transfer cleaner kit are displayed as parts of an engine of the image forming apparatus 102, in a similar manner for all these parts.

When an outer door of the image forming apparatus 102, if there are replacement parts that are not displayed in the previous embodiment until an inner door is further opened, a list of these replacement parts is displayed when the outer door is opened in order to notify an operator that there are such replacement parts.

However, in order to let the operator know that these parts cannot be replaced unless the inner door is opened, these parts are displayed in a different manner from the manner in which the replacement parts corresponding to the opening of the outer door are displayed.

More specifically, for example, replacement parts corresponding to opening of the next inner door are displayed in gray, replacement parts corresponding to opening of the outer door are displayed in a normal manner. Note that the manner of displaying replacement parts corresponding to opening of the next inner door is not limited to this example.

In the embodiment described above, the manner of displaying the list of replacement parts is controlled depending on the relationship between the opened/closed states of the outer and inner doors. Note that the present embodiment is also applicable to a case where the manner of displaying the list of replacement parts is controlled depending on the relationship between the states of opening-and-closing parts and the states of attachable-and-detachable parts.

Fifth Exemplary Embodiment

Referring to memory maps shown in FIGS. 15 and 16, data processing programs readable by the management apparatus or the printing apparatus according to the present invention are described below.

FIG. 15 is a diagram illustrating the memory map of a storage medium that stores various data processing programs readable by the management apparatus, according to the present invention.

FIG. 16 is a diagram illustrating the memory map of a storage medium that stores various data processing programs readable by the image forming apparatus, according to the present invention.

Note that in addition to information shown in FIG. 15 or 16, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions shown in FIG. 8, FIG. 9, FIG. 13, or FIG. 14 according to the embodiments of the present invention may be realized by installing a program from the outside and executing it on a host computer. In such a case, the present invention can be applied to a system in which information including such programs is supplied to an output device from a storage medium such as a CD-ROM, flash memory, or FD or from an external storage medium via a network.

The present invention may also be practiced by supplying a medium such as a storage medium having a software program code stored therein to an apparatus, loading the software program code from the medium onto a computer (or a CPU or an MPU) of a system or an apparatus, and executing the software program on the computer.

In this case, the program code read from the storage medium implements the novel functions disclosed in the embodiments described above, and the storage medium on which the program code is stored falls within the scope of the present invention.

In this case, there is no particular restriction on the form of the program as long as it functions as a program. That is, the program may be realized in various forms such as an object code, a program executed by an interpreter, script data supplied to an operating system, etc.

Storage media which can be employed in the present invention to supply the program include a floppy disk, a hard disk, an optical disk, a magneto-optical disk, an MO disk, a CD-ROM disk, a CD-R disk, a CD-RW disk, a magnetic tape, a non-volatile memory card, a ROM, and a DVD disk.

In this case, the program code read from the storage medium implements the functions disclosed in the embodiments described above, and the storage medium on which the program code is stored falls within the scope of the present invention.

The program may also be supplied such that a client computer is connected to an Internet Web site via a browser, and an original computer program or a file including a compressed computer program and an automatic installer may be downloaded into a storage medium such as a hard disk of the client computer thereby supplying the program. The program code of the program according to an embodiment of the present invention may be divided into a plurality of files, and respective files may be downloaded from different Web sites. Thus, a WWW server, an ftp server and similar servers that provide a program or a file that allows the functions according to an embodiment of the present invention to be implemented on a computer also fall within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer using the downloaded key information thereby achieving the one or more functions according to any embodiment of the present invention.

The functions disclosed in the embodiments may be implemented not only by executing the program code on a computer, but part or all of the process may be performed by an operating system or the like running on the computer in accordance with the program code. Such implementation of the functions also falls within the scope of the present invention.

Furthermore, the scope of the present invention also includes an apparatus/system in which a program code is loaded from a storage medium into a memory provided on a function extension board inserted in a computer or provided in a function extension unit connected to the computer, and then a part of or the whole of a process is performed by a CPU or the like in the function extension board or the function extension unit in accordance with the program code thereby implementing the functions of any embodiment described above.

Note that the present invention is not limited to the details of the embodiments described above, but various modifications (including combinations of embodiments) are possible without departing from the spirit and the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-266740 filed Oct. 12, 2007, which is hereby incorporated by reference herein in its entirety.

What is claimed is:
1. A management apparatus comprising:
a storage unit configured to store management information indicating a correspondence among operation mode of an image forming apparatus, a status change in the operation mode, and replacement part information, wherein the operation mode includes a plurality of modes at least from among an operator maintenance mode, a service mode and a normal mode;
a receiving unit configured to receive a notification indicative of one of the plurality of modes, as the operation mode of the image forming apparatus;
an acquisition unit configured to acquire the status change in the image forming apparatus;
a generation unit configured to refer to the management information stored in the storage unit and generate a replacement part list according to the operation mode of the image forming apparatus received via the receiving unit and the status change acquired via the acquisition unit; and
a transmitting unit configured to transmit the replacement part list generated by the generation unit to the image forming apparatus,
wherein the management information indicates the replacement part information of different replacement parts to be replaced in the respective plurality modes, and
wherein the generation unit generates a replacement part list according to a sequential order of opening and closing a plurality of opening-and-closing parts disposed in the image forming apparatus and/or a sequential order of detaching and attaching a plurality of attachable-and-detachable parts disposed in the image forming apparatus, and wherein, in the management information, the replacement part information defines, according to opening and closing of any one of the plurality of opening-and-closing parts or detaching and attaching of any one of the plurality of attachable-and-detachable parts, candidates of different replacement parts in the respective plurality modes.

2. The management apparatus according to claim 1, wherein the status change managed in the management information includes an opened/closed state of an openable-and-closable door disposed for use in part replacement in the image forming apparatus.

3. The management apparatus according to claim 1, wherein:
the generation unit produces information associated with an operation instruction thereby to prompt the status change acquired by the acquisition unit to be further changed to make it possible to further replace a part included in the replacement part list in the image forming apparatus following replacement of a part corresponding to the status change acquired by the acquisition unit; and
the transmitting unit transmits the information generated by the generation unit as to the operation instruction as well as the replacement part list generated by the generation unit.

4. The management apparatus according to claim 1, wherein the sequential order of opening and closing the plurality of opening-and-closing part and/or the sequential order of removing and attaching the plurality of attachable-and-detachable parts are determined by locations of the opening-and-closing parts and/or the attachable-and-detachable parts or by engagement states of the opening-and-closing parts and/or the attachable-and-detachable parts.

5. The management apparatus according to claim 1, further comprising a management unit configured to manage a number of stocked parts based on a replacement notification about a part included in the transmitted replacement part list.

6. The management apparatus according to claim 1, further comprising a writing unit configured to write the acquired status change in a log table,
wherein the generation unit generates the replacement part list according to the operation mode of the image forming apparatus received via the receiving unit and the status change in the log table, and
wherein the writing unit does not write the acquired status change if the operation mode of the image forming apparatus has switched into the normal mode.

7. An image forming apparatus configured to communicate with a management apparatus configured to manage replacement part information, comprising:
a notification unit configured to notify the management apparatus of an operation mode specified from an operation unit and a status change in the image forming apparatus;
an acquisition unit configured to acquire a replacement part list produced using the replacement part information by the management apparatus in accordance with the operation mode and the status change notified by the notification unit; and
a display control unit configured to change a list displayed on the operation unit in accordance with the acquired replacement part list, wherein the operation mode in the image forming apparatus includes a plurality of modes at least from among an operator maintenance mode, a service mode and a normal mode, and
wherein the image forming apparatus manages the replacement part information that defines, according to opening and closing of any one of a plurality of opening-and-closing parts disposed in the image forming apparatus or detaching and attaching of any one of a plurality of attachable-and-detachable parts disposed in the image forming apparatus, candidates of different replacement parts in the respective plurality modes.

8. The image forming apparatus according to claim 7, further comprising a determination unit configured to determine whether there is a replacement part list corresponding to the operation mode and the status change notified by the notification unit, wherein
in a case where the determination unit determines that the replacement part list is not found, the display control unit displays a prestored replacement part list.

9. The image forming apparatus according to claim 7, wherein the notification unit notifies the management apparatus of the status change based on an order of opening and closing a plurality of opening-and-closing parts disposed in the image forming apparatus and/or an order of detaching and attaching a plurality of attachable-and-detachable parts.

10. A method in a management apparatus for managing replacement part information in relation to an operation mode of an image forming apparatus and a status change in each operation mode, wherein the operation mode includes a plurality of modes at least from among an operator maintenance mode, a service mode and a normal mode comprising:
receiving a notification indicative of one of the plurality of modes, as the operation mode of the image forming apparatus;
acquiring the status change in the image forming apparatus;
generating a replacement part list, including referring to the management information stored in the storage unit, and generating the replacement part list based on the operation mode of the image forming apparatus received and the status change acquired; and
transmitting the replacement part list generated to the image forming apparatus,
wherein the a replacement part list is generated according to a sequential order of opening and closing a plurality of opening-and-closing parts disposed in the image forming apparatus and/or a sequential order of detaching and attaching a plurality of attachable-and-detachable parts disposed in the image forming apparatus, and
wherein, in the management information, the replacement part information defines, according to opening and closing of any one of the plurality of opening-and-closing parts or detaching and attaching of any one of the plurality of attachable-and-detachable parts, candidates of different replacement parts in the respective plurality modes.

11. The management method according to claim 10, wherein the status whose change is managed includes an opened/closed state of an openable-and-closable door disposed for use in part replacement in the image forming apparatus.

12. The management method according to claim 10, wherein
the generation step includes producing information associated with an operation instruction thereby to prompt the status change acquired to be further changed so as to make it possible to further replace a part included in the replacement part list in the image forming apparatus following replacement of a part corresponding to the status change acquired; and the transmission step includes transmitting the information generated as to the operation instruction as well as the replacement part list generated.

13. The management method according to claim 10, wherein the sequential order of opening and closing the plurality of opening-and-closing part and/or the sequential order of removing and attaching the plurality of attachable-and-detachable parts are determined by locations of the opening-and-closing parts and/or the attachable-and-detachable parts or by engagement states of the opening-and-closing parts and/or the attachable-and-detachable parts.

14. A non-transitory computer-readable storage medium in which a program is stored, the program being executable by a computer to perform the management method according to claim 10.

15. The management method according to claim 10, further comprising managing a number of stocked parts based on a replacement notification about a part included in the transmitted replacement part list.

16. The management method according to claim 10, further comprising writing the acquired status change in a log table,
 wherein the replacement part list is generated according to the operation mode of the image forming apparatus received and the status change in the log table, and
 wherein the acquired status change is not written if the operation mode of the image forming apparatus has switched into the normal mode.

17. An information processing method in an image forming apparatus configured to communicate with a management apparatus configured to manage replacement part information, comprising:
 notifying the management apparatus of an operation mode specified from an operation unit and a status change in the image forming apparatus;
 controlling information displayed on the operation unit, the controlling step including acquiring a replacement part list produced using the replacement part information by the management apparatus in accordance with the operation mode and the status change notified in the notification step, and changing a list displayed on the operation unit in accordance with the acquired replacement part list,
 wherein the operation mode in the image forming apparatus includes a plurality of modes at least from among an operator maintenance mode, a service mode and a normal mode, and
 wherein the management apparatus manages the replacement part information that defines, according to opening and closing of any one of a plurality of opening-and-closing parts disposed in the image forming apparatus or detaching and attaching of any one of a plurality of attachable-and-detachable parts disposed in the image forming apparatus, candidates of different replacement parts in the respective plurality modes.

18. The information processing method according to claim 17, further comprising determining whether there is a replacement part list corresponding to the operation mode and the status change notified, wherein
 in a case where a result of the determination indicates that the replacement part list is not found, the information displayed on the operation unit includes displaying a prestored replacement part list.

19. The information processing method according to claim 17, wherein the notifying includes notifying the management apparatus of the status change based on an order of opening and closing a plurality of opening-and-closing parts disposed in the image forming apparatus and/or an order of detaching and attaching a plurality of attachable-and-detachable parts.

20. A non-transitory computer-readable storage medium in which a program is stored, the program being executable by a computer to perform the information processing method according to claim 17.

* * * * *